(12) United States Patent
Akiyama et al.

(10) Patent No.: US 7,508,760 B2
(45) Date of Patent: Mar. 24, 2009

(54) DATA DISTRIBUTION SERVER AND TERMINAL APPARATUS

(75) Inventors: Yasuhiro Akiyama, Ome (JP); Junichi Kimura, Koganei (JP); Toru Yokoyama, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 908 days.

(21) Appl. No.: 10/649,702

(22) Filed: Aug. 28, 2003

(65) Prior Publication Data
US 2004/0202109 A1    Oct. 14, 2004

(30) Foreign Application Priority Data
Apr. 10, 2003    (JP)    ............... 2003-105956

(51) Int. Cl.
*G01R 31/08*    (2006.01)
(52) U.S. Cl. ............... 370/232; 370/235; 370/236; 370/389; 370/474; 709/203; 709/232; 709/233; 709/234; 709/235; 455/69; 455/88
(58) Field of Classification Search ......... 370/229–236, 370/389, 474; 455/69, 88; 709/232–235, 709/203
See application file for complete search history.

(56) References Cited

U.S. PATENT DOCUMENTS

| | | | |
|---|---|---|---|
| 6,690,646 B1 * | 2/2004 | Fichou et al. ............... | 370/231 |
| 6,731,600 B1 * | 5/2004 | Patel et al. .................. | 370/230 |
| 6,956,869 B1 * | 10/2005 | Kato ........................... | 370/468 |
| 6,992,981 B2 * | 1/2006 | Morikawa et al. ........... | 370/229 |
| 7,043,560 B2 * | 5/2006 | Coulombe et al. .......... | 709/232 |
| 2002/0136164 A1 * | 9/2002 | Fukuda et al. ............... | 370/230 |
| 2003/0037158 A1 * | 2/2003 | Yano et al. ................... | 709/232 |

FOREIGN PATENT DOCUMENTS

| | | |
|---|---|---|
| JP | 10-336626 | 12/1998 |
| JP | 2000-332829 | 11/2000 |
| JP | 2000-349808 | 12/2000 |
| JP | 2001-69483 | 3/2001 |
| JP | 2002-344560 | 11/2002 |

OTHER PUBLICATIONS

Japan Patent Office, Office Action dated Jul. 1, 2008 in corresponding JP patent application No. 2003-105956.

* cited by examiner

*Primary Examiner*—Aung S Moe
*Assistant Examiner*—Christopher P Grey
(74) *Attorney, Agent, or Firm*—Mattingly, Stanger, Malur & Brundidge P.C.

(57) ABSTRACT

A radio line is easily influenced in its nature by attenuation or reflection of an electromagnetic wave or the like and the surrounding environment. Due to this fact, a variation of the data transfer speed frequently occurs at the time of image streaming so as to become a hindrance to reproduction of an image at the receiving terminal. A distribution server is provided with a multiplexer for multiplexing information indicating the transmission start time for the image data and a switching unit for switching an image bit rate in response to a request from the receiving terminal. The receiving terminal uses information indicating a transmission start time for the image data, monitors the receiving bit rate and sends out a request for transmission of the most-suitable image bit rate in response to a comparison thereof.

7 Claims, 16 Drawing Sheets

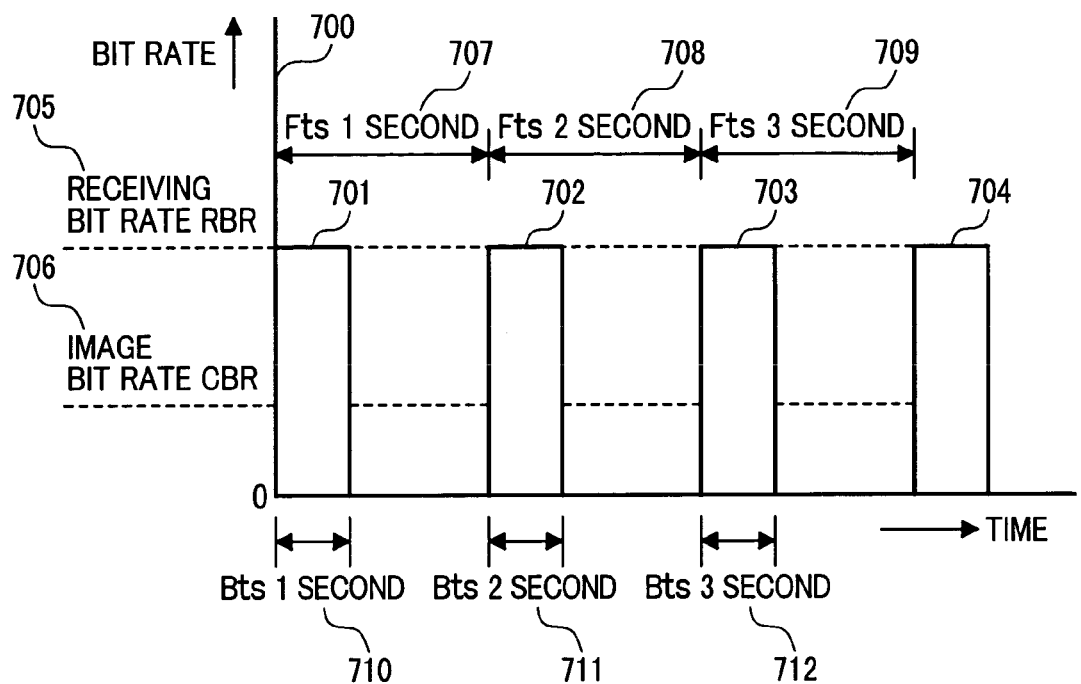

IMAGE BIT RATE SWITCHING POINT TABLE

| MODE | UPPER LIMIT BIT RATE UBR | LOWER LIMIT BIT RATE BBR |
|---|---|---|
| 0 | 1.2Mbps | NO SETTING |
| 1 | 2.2Mbps | 1.8Mbps |
| 2 | NO SETTING | 2.8Mbps |

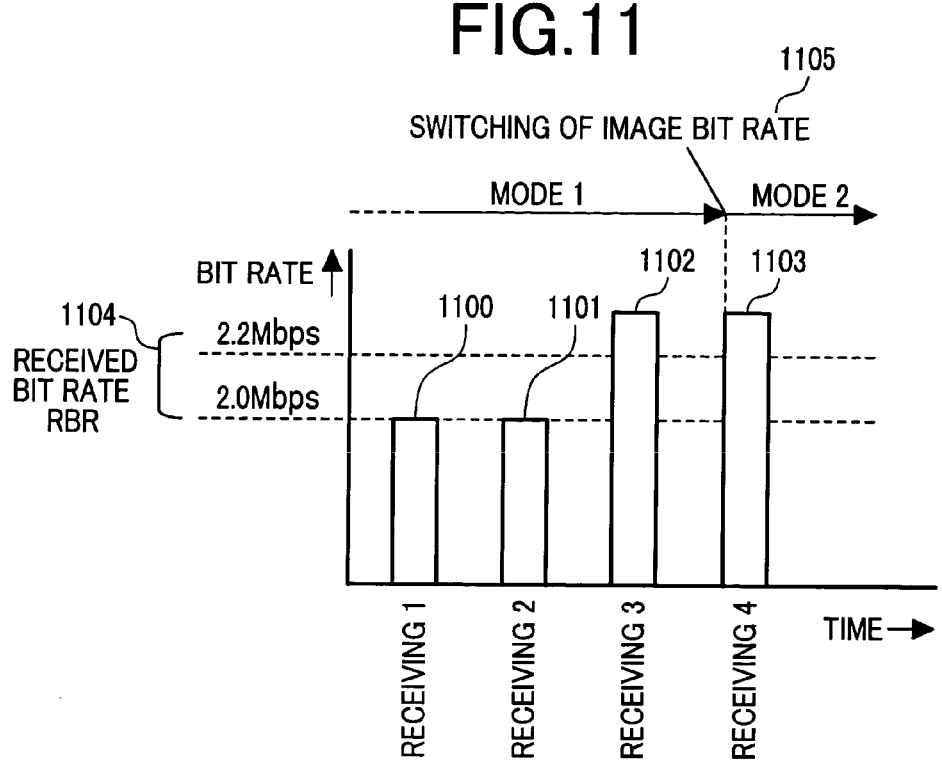
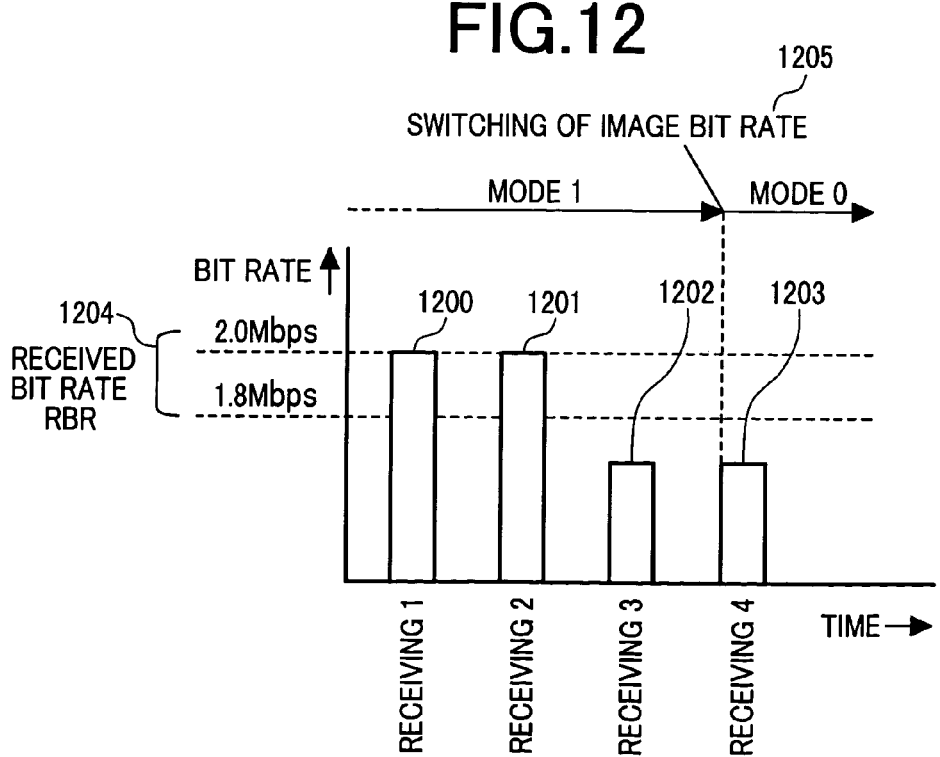

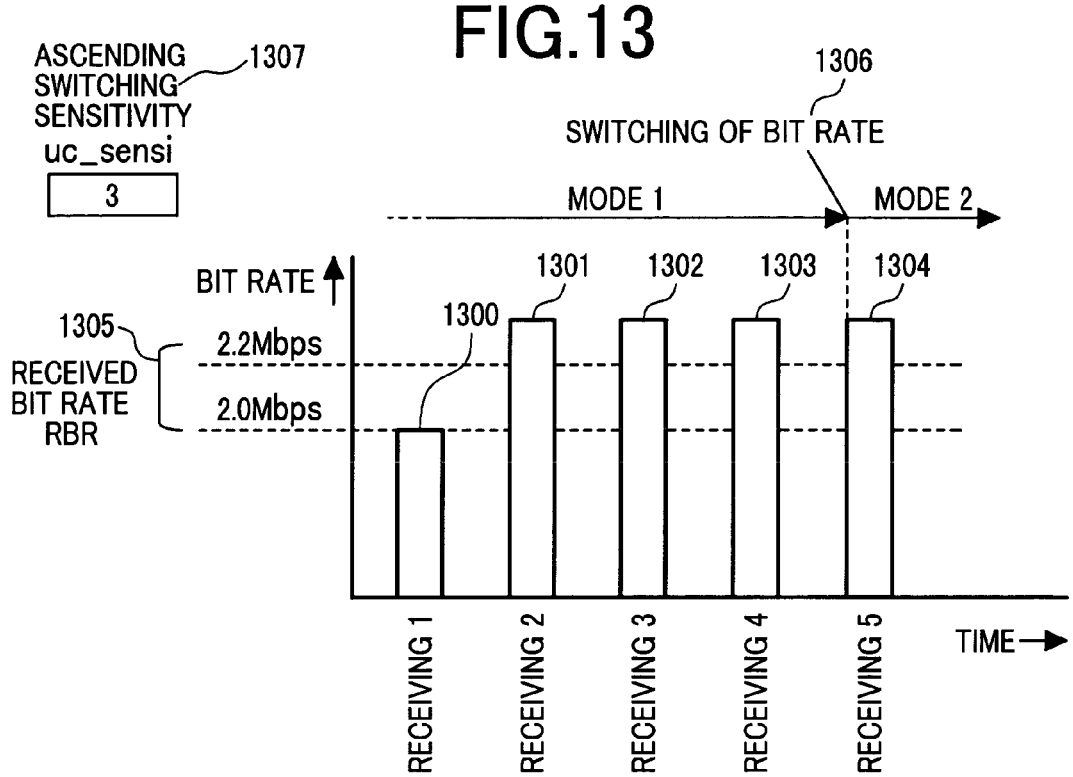
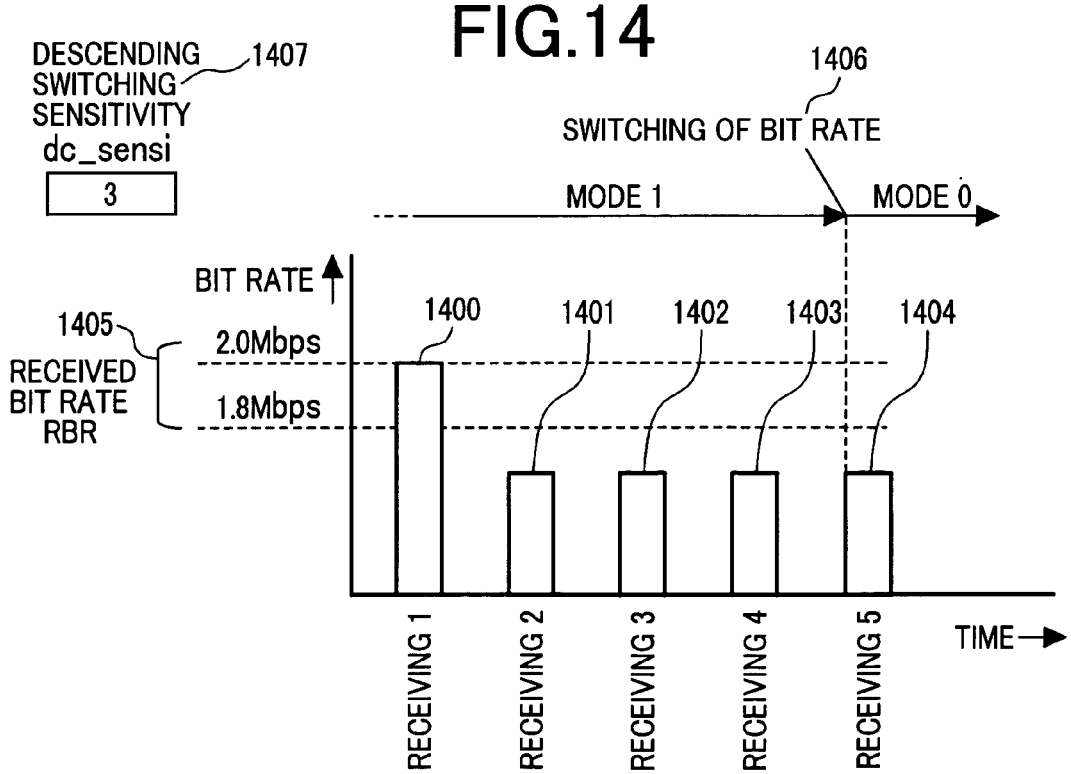

DATA DISTRIBUTION SERVER AND TERMINAL APPARATUS

FIELD OF THE INVENTION

This invention relates to an apparatus for switching a bit rate of the distributed image in response to a result of monitoring of a received state of data at a mobile terminal and to a method of switching the bit rate in an image distribution system in which streaming is carried out for the coded image data from the distribution server toward the mobile terminal through a radio circuit.

BACKGROUND OF THE INVENTION

In recent years, rapid development of broadband technology and the increased use of a mobile terminal, such as a mobile phone or PDA (Personal Digital Assistance) or the like, have expanded image streaming services under an application of radio infra-structures, such as a cellular phone communication network or radio LAN (Local Area Network) and the like. A problem found in image streaming services under application of a radio network consists in a variation of the electromagnetic wave receiving state. As the receiving state is varied, an error in the receiving operation frequently occurs, resulting in an increase in the re-transmission amount of data. Due to this influence, there may occur a case in which the rate of transfer of the streaming data is varied and a reproduction of an image cannot be executed accurately. In particular, it becomes a serious problem as to how to deal with a case in which a state having a superior receiving capability is switched toward a deteriorating receiving capability state.

The control method typically used in responding to an electromagnetic wave receiving state in an image distribution system involves a method in which the receiving terminal monitors the electromagnetic wave receiving state during a predetermined time interval in an electronic mail system, and then the order of transmission of the mail items distributed by the distribution server is changed in response to a situation of change (for example, refer to the Patent Document 1).

In addition, as the transmission method that is used with a moving image transmission device, there is also provided a method in which the receiving terminal always supplies information indicating the receiving state to the distribution server to execute control over the data communication speed at the distribution server (for example, refer to the Patent Document 2).

Further, there is also provided a method for executing control over the data communication speed in which the data communication speed is estimated at a mobile receiving terminal in reference to the electromagnetic wave receiving state and the content of the distributed image (sports and news or the like) and the result of estimation is communicated to the distribution server (for example, refer to the Patent Document 3).

[Patent Document 1] JP-A No. 349808/2000
[Patent Document 2] JP-A No. 69483/2001
[Patent Document 3] JP-A No. 344560/2000

SUMMARY OF THE INVENTION

The methods disclosed in the Patent Documents 1 and 3 described above are carried out in such a way that the received state is monitored through observation of the intensity of an electromagnetic wave at the receiving terminal. However, in the case where many receiving terminals are concentrated at a certain one base center and the like, it sometimes happens that the intensity of an electromagnetic wave and the data communication speed are not necessarily proportionate to each other. Thus, in the case of this method, it is not possible to attain a complete holding of the received state at the terminal unit.

The method described in the Patent Document 2 is carried out such that the receiving terminal unit always continues to transmit information concerning the received state relative to the distribution server in order to cause the distribution server to judge the received state at the receiving terminal unit. Due to this fact, the receiving terminal unit must always execute both transmission and reception at the time of an image streaming operation, resulting in the fact that this method produces a problem in that the line available efficiency is reduced, and, at the same time, the processing load at the receiving terminal unit is increased.

This invention is provided to solve the aforesaid problems, and it is an object of this invention to provide means for causing the receiving terminal itself to accurately monitor the receiving bit rate at the time of an image streaming operation, so as to be capable of executing a stable image streaming by requesting the distribution server to switch the receiving bit rate to the most-suitable image bit rate in response to the result of the monitoring operation.

The distribution server in an image distribution system using a radio infrastructure has means for multiplexing information indicating an image data transmission start time in the image data to be distributed, and means for switching the image bit rate in response to a request from a receiving terminal. In addition, the receiving terminal unit is provided with means for monitoring the receiving bit rate through utilization of information indicating the image data transmission start time and for sending a transmission request for the most suitable image bit rate to the distribution server in response to a result of the monitoring.

BRIEF DESCRIPTION OF THE DRAWINGS

FIG. 7 is a diagram which shows a relation between a data transferring time in an image data distribution and a bit rate;

FIG. 8 shows one example of an image bit rate table;

FIG. 11 is a diagram which shows one example of an image bit rate switching operation for an upper level mode;

FIG. 12 is a diagram which shows one example of an image bit rate switching operation for an upper level mode;

FIG. 13 is a diagram which shows another example of an image bit rate switching operation for an upper level mode;

FIG. 14 is a diagram which shows another example of an image bit rate witching operation for a lower level mode;

DETAILED DESCRIPTION OF THE PREFERRED EMBODIMENTS

Figure 1:
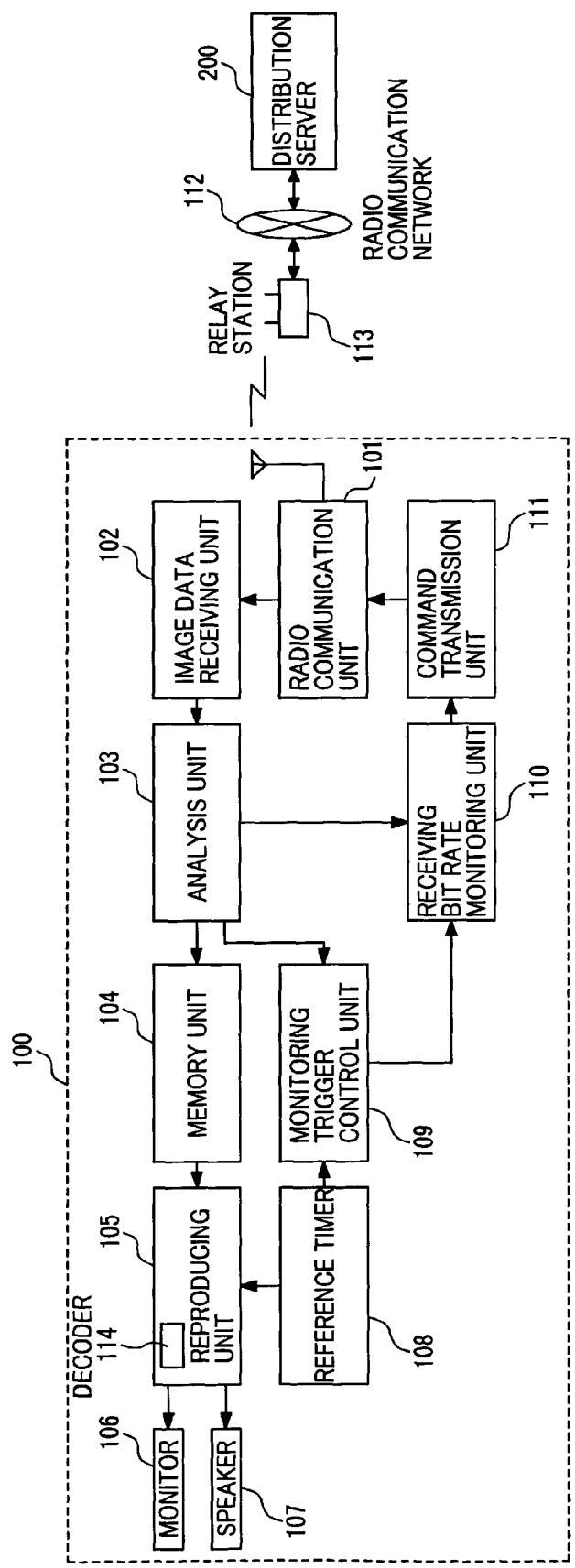
FIG. 1 is a block diagram which shows an example of the configuration of a receiving terminal unit.

Referring now to the drawings, some preferred embodiments of an image distribution apparatus and an image receiving method in accordance with the present invention will be described.

FIG. 1 shows an example of the configuration of a receiving terminal unit 100 of the present invention.

Image data received by the receiving terminal unit 100 is data that has been compressed by a predetermined coding system, such as MPEG or the like, and the image data is distributed from a distribution server 200 to the receiving terminal 100 through a radio communication network 112 and a relay station 113.

The radio communication unit 101 transmits and receives data through radio communication with the distribution server 200. An image data receiving unit 102 receives data transmitted from the distribution server 200. The received image data is stored in a memory unit 104 through an analysis unit 103. The analysis unit 103 performs an extraction to extract monitoring trigger information included in the image data, and it supplies this information to a monitoring trigger control unit 109 and indicates a data size of the image data to a receiving bit rate monitoring unit 110. The monitoring trigger information is information indicating a time in which the receiving bit rate-monitoring unit 110 starts a monitoring operation, or information becoming a trigger in which the receiving bit rate-monitoring unit starts a monitoring operation. The memory unit 104 is used for temporarily storing the image data. A reproducing unit 105 reads out the image data in sequence from the memory unit 104 to perform expansion processing, the moving image after expansion is displayed at a monitor 106 and its audio signal is outputted at a speaker 107. Further, in the case where the received image data is enciphered, the reproducing unit 105 is provided with a decoder 114 to perform a decoding operation. It is of course apparent that when the image data is not enciphered, this decoder is not needed. A reference timer 108 provides a reference for synchronous reproduction for both the moving image and audio. In addition, the reference timer 108 is also used for effecting a comparison at the monitoring trigger control unit 109 with a time included in the monitoring trigger information. The monitoring trigger control unit 109 compares a time at the reference timer 108 with a time indicated in the monitoring trigger information, and when they coincide with each other, this monitoring trigger control unit 109 applies a trigger for starting the monitoring operation with respect to the receiving bit rate-monitoring unit 110. The receiving bit rate-monitoring unit 110 performs a monitoring operation with respect to the received bit rate from a time in which the trigger is applied from the monitoring trigger control unit 109. In the case where a result of monitoring is displaced out of a predetermined bit rate range, a command transmission unit 111 requests an image data bit rate switching in the distribution server 200. When the result of the monitoring operation is in a predetermined bit rate range, it does not request a bit rate switching in the distribution server 200. The command transmission unit transmits commands of a start of distribution of image data, a stopping of the distribution of image data and an image bit rate switching request and the like to the distribution server 200.

Figure 2:
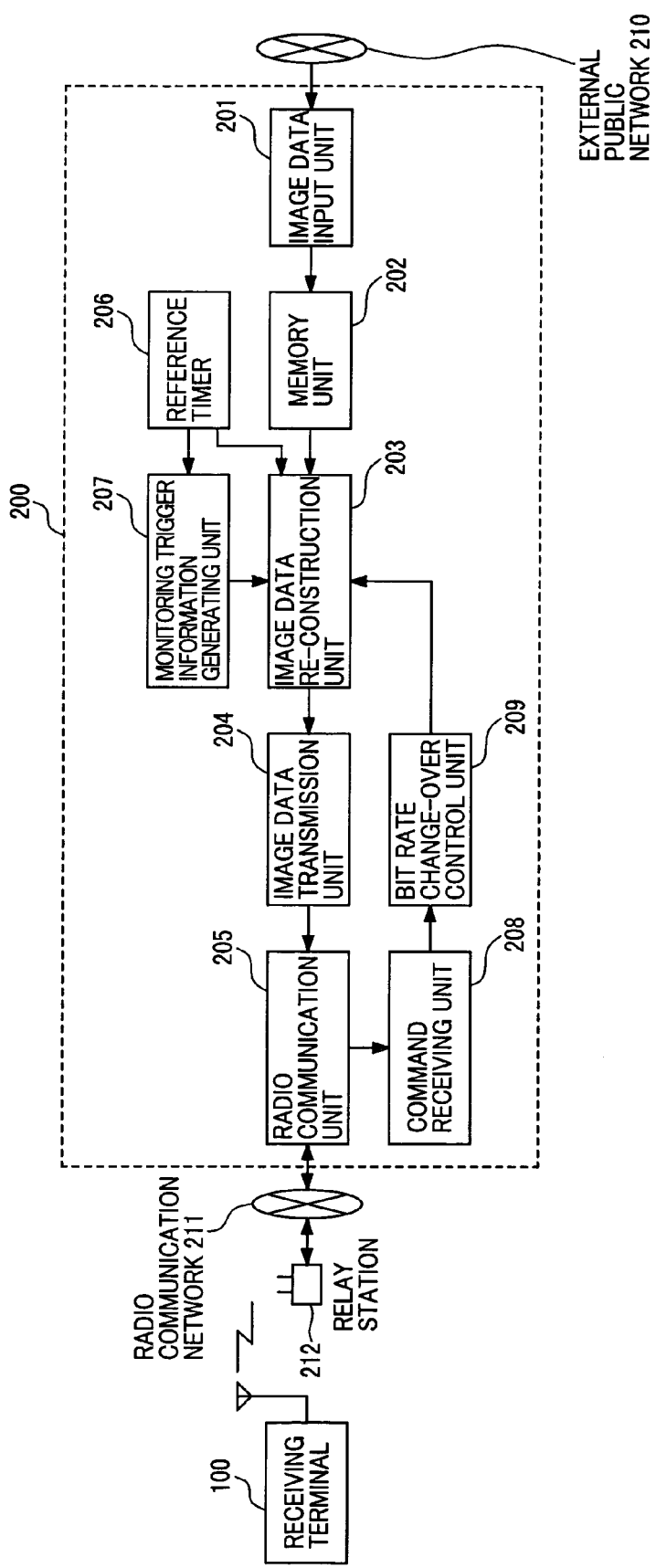
FIG. 2 is a block diagram which shows an example of the configuration of a distribution server.

FIG. 2 shows an example of the configuration of the distribution server 200 of the present invention.

Image data transmitted through an external public network 210, such as the internet or the like, is received at the image data input unit 201 and stored at the memory unit 202. The reference timer 206 generates reproducing time information to be applied at the time of reproduction of the image data at the receiving terminal unit 100 and transmits it to the image data re-construction unit 203. A monitoring trigger information generating unit 207 refers to the time information of the reference timer 206, generates monitoring trigger information to be used by the receiving bit rate monitoring unit 110 of the receiving terminal unit 100 and transmits it to the image data re-construction unit 203. The image data re-construction unit 203 multiplexes the reproduced time information obtained from the reference timer 206 and the monitoring trigger information obtained from the monitoring trigger information-generating unit 207 on the image data read out of the memory unit 202. The image data transmission unit 204 transmits the multiplexed image data to the receiving terminal 100. As also shown in FIG. 1, the image data transmitted from the distribution server 200 is transmitted to the receiving terminal 100 through the radio communication network 112 and the relay station 113. The radio communication unit 205 performs a transmission and a reception of data with the receiving terminal 100 through radio communication. The command receiving unit 208 receives some commands, such as for start of distribution, stopping of the distribution and an image bit rate switching request and the like that has been sent from the receiving terminal 100. The bit rate switching control unit 209 performs a switching from the image bit rate during the present distribution operation to an image bit rate indicated in the command when the bit rate switching control unit 209 receives the image bit rate switching request command from the receiving terminal 100.

FIG. 3 shows an example of the structure of the image data.

The image data has a structure in which a plurality of fragments 300 are in a continuous form. The fragments 300 constitute a certain collected data unit in which the image data is divided by every predetermined reproduction time length, and control information required for reproduction is added to each image data. The time length applied as a reference for the data dividing operation can be optionally set, and it may also be applicable that each of them has a different length relative to each other.

Figure 3A:
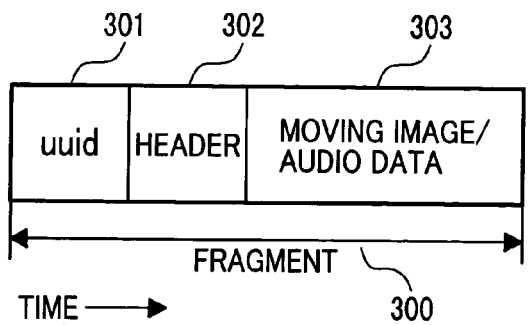
FIGS. 3A and 3B are diagrams which show an example of the configuration of image data.

FIG. 3A shows an example of the structure of one fragment 300. The fragment 300 is constituted by a row of telop characters optionally displayed in multiplex form on the reproduced image or the like, "uuid" (Universal Unique Identifier) (301) having additional information stored in it that a user can optionally define, a header 302 having information required for reproduction, such as random access control information and the like, and a moving image of a predetermined reproduction time length and associated audio data 303. In the case of the example illustrated in this figure, although one "uuid" is provided on the left in the fragment, it may also be applicable that a plurality of "uuid"s are provided in response to the number of user defined information. In the case of the image distribution method of the present invention, monitoring trigger information is stored in one of the "uuid"s. The monitoring trigger information is used as a trigger for starting a measurement of the received bit rate. Data transfer of one fragment is effected by a burst transfer (its details will be described later in reference to FIG. 7). The receiving terminal 100 can accurately determine a burst transfer starting time in reference to the monitoring trigger information, so as to cause the measurement accuracy of the receiving bit rate to be improved. The monitoring trigger information is information regarding a transmission and reception of the image data, and this information has no direct relation with the reproduction of the image. Accordingly, it is desirable to insert it into the "uuid" for the purpose of storing optional information concerning the reproduction of the image. In addition, "uuid" is operated through utilization of an ID assured that it is not overlapped in the system. The system not requiring any monitoring trigger information enables the monitoring trigger information to be ignored through discrimination of the ID, and it has also an effect to prevent any unintentional erroneous operation. It is of course apparent that it can be inserted into a header other than the "uuid".

Figure 3B:
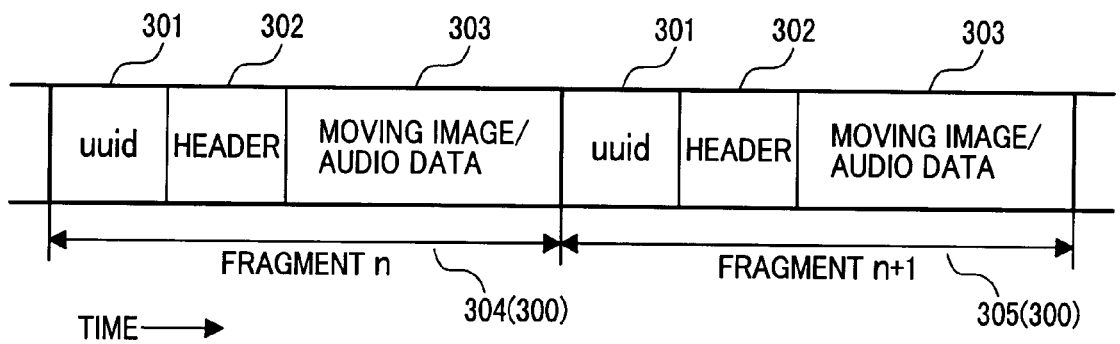

FIG. 3(B) shows an example of the data structure having a plurality of fragments 300 connected to each other. An arrangement of the fragment 300 of the image data becomes a structure in which the fragments are arranged from the leading one in the order of the reproducing time. In the case of the example shown in this figure, the fragment (304) is reproduced at first and then the fragment$_{n+1}$ (305) is reproduced. As shown in FIG. 3(A), the "uuid" (301), the header (302) and the moving image and audio data (303) constitute each of the fragments.

FIG. 4 shows an example of the structure of the "uuid" (301).

Figure 4A:
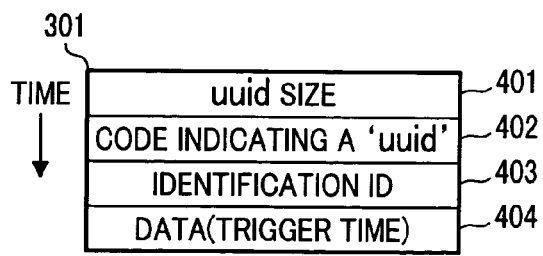
FIGS. 4A and 4B are diagrams which show an example of the structure of "uuid"
Figure 4B:
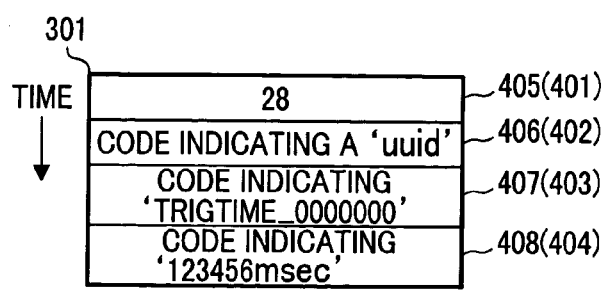

The "uuid" is data that a user optionally can define, and the moving image and the audio data are separately added to the image data. As shown in FIG. 4(A), the "uuid" (301) is constituted by information indicating the size of the entire "uuid", a row of text characters (402) expressing "uuid", an identification ID (403) and a data unit (404). In the case that the monitoring trigger information is stored in the "uuid" (301), the trigger time information instructing a starting of the received bit rate monitoring operation at the receiving terminal 100 is stored at the data unit (404). FIG. 4(B) shows one example of the "uuid" (301) having the monitoring trigger information stored in it. In the example shown in FIG. 4(B), the "uuid" size 405 indicates 28 bytes. The row of text characters (406) expressing the "uuid" is common irrespective of the type of "uuid" and the processing unit recognizes that this data is a "uuid" through the row of text characters. The identification ID (407) is a code for use in recognizing the type of "uuid". In the case of the example shown in this figure, the identification ID (407) is a code indicating that the row of characters expressing "TRIGTIME-0000000" is monitoring trigger information, and the receiving terminal 100 detects the row of characters and recognizes the monitoring trigger information. "123456 msec" stored at the final data 408 is information expressing a trigger time at the receiving terminal 100.

Figure 5:
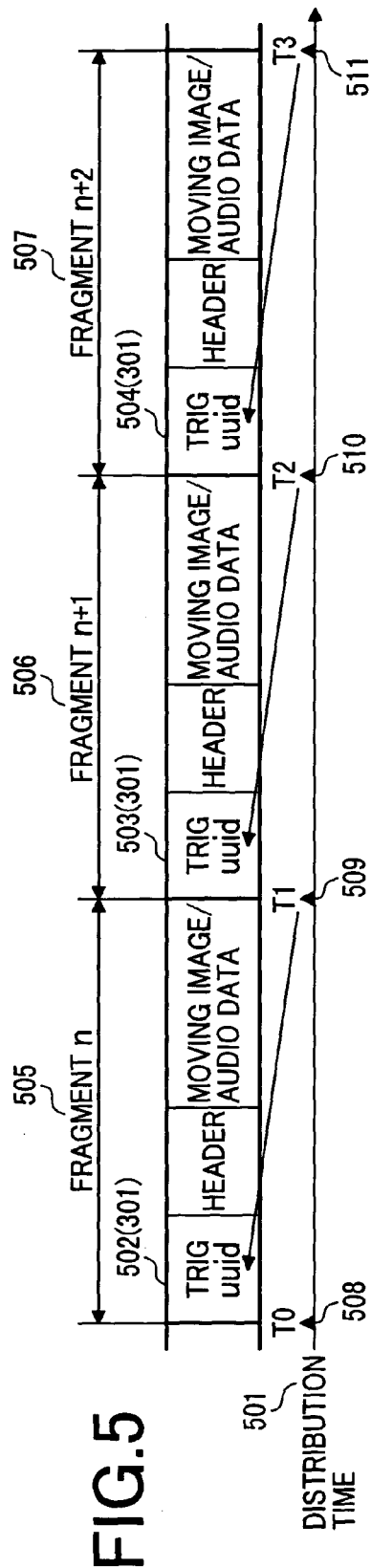
FIG. 5 is a diagram which shows a concept of generating "uuid" storing a monitoring trigger information.

FIG. 5 illustrates the concept for generating the "uuid" storing the monitoring trigger information at the distribution server 200.

In this figure, the "uuid" storing the monitoring trigger information is indicated as TRIGuuid. TRIGuuid (502) of a fragment$_n$ (505) that is distributed at a distribution time T0 (508) stores a planned time T1 (509) in which the next fragment$_{n+1}$ (506) is to be distributed. Similarly, TRIGuuid (503) of a fragment$_{n+1}$ (506) that is distributed at a distribution time T1 (509) stores a planned time T2 (510) in which a fragment$_{n+2}$ (507) that is is to be distributed, and TRIGuuid (504) of a fragment$_{n+2}$ (507) that is distributed at a distribution time T2 (510) stores a planned time T3 (511) in which a subsequent fragment is to be distributed. In this way, the TRIGuuid of the fragment at a certain distribution time stores without fail a distribution planned time for the fragment to be distributed next.

As another preferred embodiment, it is also possible that TRIGuuid stores a distribution-planned time for either a header part or a moving image/audio data in the same fragment. In this case, although TRIGuuid is out of a target of a receiving bit rate measurement, this does not become a substantial problem because the data size of TRIGuuid is quite small as compared with that of its subsequent moving image/audio data.

As a further preferred embodiment, in the case where the distribution server 200 and the receiving terminal 100 store a transmitter of the same clock, it may also be possible that TRIGuuid stores a clock counter value to be distributed in place of the time information. The clock counter value may be a calculated clock value from the starting time or a relative clock value from a previous fragment distribution.

Figure 6:
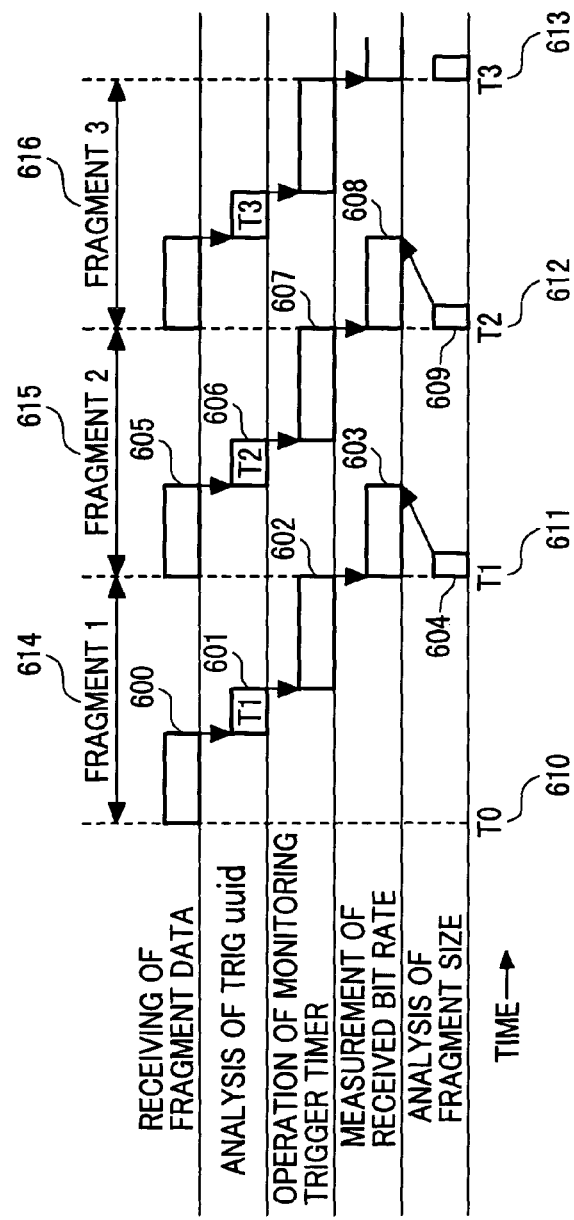
FIG. 6 is a time chart of a receiving bit rate monitoring.

FIG. 6 shows a time-chart for receiving bit rate monitoring at the receiving terminal 100.

Since data transfer of one fragment is carried out in a burst transfer, the data transfer is completed in a shorter time than the image data reproducing time of that fragment. The receiving bit rate at the receiving terminal 100 is calculated through measurement of a time of this burst transfer segment and a received data size. For example, a processing at the time of receipt of a fragment at the receiving terminal 100 is carried out as shown in FIG. 6. At first, a fragment 1 (614) is received (600) at a time T0 (610) and then TRIGuuid having the monitoring trigger information stored therein is analyzed (601) at the analysis unit (103). This TRIGuuid stores the receiving time T1 (611) of a next fragment 2. A monitoring trigger control unit 109 at the receiving terminal 100 performs a time comparing processing (602) with the reference timer 108 for a receiving time T1 (611). The distribution server 200 starts a distribution of the fragment 2 (615) from a time of T1 (611). The receiving terminal 100 performs a data receiving operation (605) of the fragment 2 (615) from a time T1 (611) and concurrently starts a measurement of the receiving bit rate at (603). In addition, the header of the fragment 2 (605) stores a data size of the fragment. This data size is read out and used for detection of a completion of the data receiving for the fragment 2 and a completion of measurement of the receiving bit rate. Also, at the time of data receipt of the fragment 2 (615) and the fragment 3 (616) after this operation, the processing is carried out in the order of the data receipt of fragment (605), TRIGuuid analysis (606), a timer operation of monitoring trigger (607), a receiving bit rate measurement (608) and a fragment size analysis (609).

FIG. 7 shows a relation between a typical data transfer time and a bit rate at an image data distribution.

As already been described with reference to FIG. 6, since the data transfer for one fragment is a burst transfer, the data transfer is completed in a shorter time than an image data reproducing time for that fragment. The time for the data transfer is determined in reference to the transfer frequency of a radio line. Upon receiving the image data fragment having an image bit rate CBR (706) and an image reproducing time Fts1 second (707) at the receiving terminal 100, the data is received at a faster receiving bit rate RBR (705) than the image bit rate CBR (706), so that a receipt of data is completed in a shorter Bts1 sec. than an image reproducing time Fts1 sec. (707). If it is assumed that the size of each of the fragments (701, 702, 703) and the receiving bit rate RBR (705) are kept constant, fragment-receiving times (710, 711, 712) are also kept constant. However, actually, since the fragment size and the receiving bit rate are changed for every fragment, the fragment receiving time does not become a constant value as shown in FIG. 7.

FIG. 8 shows one example of an image bit rate table 800.

An image bit rate table 800 is a table indicating the type of the image bit rate CBR (706) that the distribution server 200 can deliver. Both the distribution server 200 and the receiving terminal 100 use this table.

In the example illustrated in the figure, it is possible to deliver three kinds of image bit rates of 100 kbps, 200 kbps and 300 kbps. The number of image bit rates can be optionally set and the value of the bit rate can also be optionally set. In order to identify the type of image bit rate CBR (706), the mode 801 is used. In this figure, the mode 0 (802) is 100 kbps, the mode 1 (803) is 200 kbps and the mode 2 (804) is 300 kbps.

In the case where a plurality of bit rates are to be prepared for the same image, the amount of data to be distributed is changed and the bit rate is changed by changing the image quality of the image, the quality of the audio, the image size and the displayed number of an image per specified unit of the image and the like. The receiving bit rate-monitoring unit 110 at the receiving terminal 100 refers to the image bit rate table 800. This table may constitute a predetermined exclusive memory at the receiving terminal 100 or a part of the memory unit 104. Additionally, the bit rate switching control unit 209 refers at the distribution server 200. This table may be stored in a predetermined exclusive memory in the same manner as that for the receiving terminal 100 or it may be a part of the memory unit 202.

Figures 9, 10:
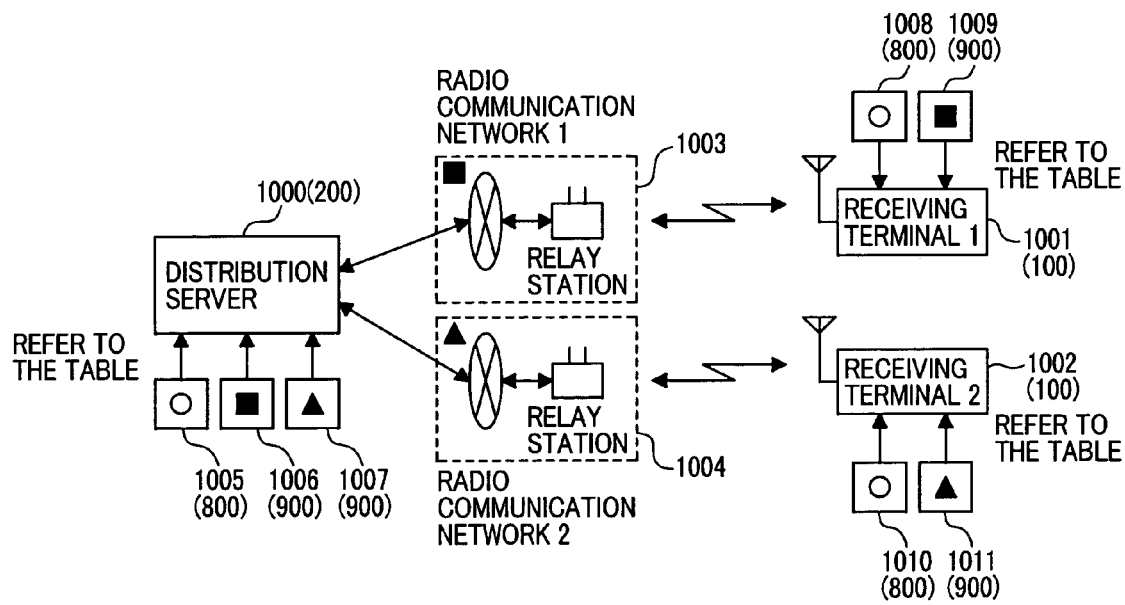
FIG. 9 shows one example of an image bit rate switching point table.
FIG. 10 is a diagram which shows a form of use of an image bit rate table and an image bit rate switching point table.

FIG. 9 is a diagram showing one example of an image bit rate switching point table 900.

The image bit rate switching point table 900 is a table used for performing a comparison with a received bit rate measured by the receiving bit rate-monitoring unit 110 of the receiving terminal 100 and is referred to judge whether or not it is to be switched to another bit rate related to the distribution server. The receiving terminal 100 uses this table and this is constituted by information of the upper limit bit rate UBR (901) and information of a lower limit bit rate BBR (902) for every mode 903 of the image bit rate. The type of mode 903 is set such that it may coincide with the image bit rate table 800. The upper limit bit rate UBR (901) and the lower limit bit rate BBR (902) are set in response to a relation of performance between a fragment size distributed by the distribution server 200 and the transfer frequency of the radio line to be used. In the example shown in this figure, no image bit rate switching is carried out if the receiving bit rate is between 1.8 Mbps and 2.2 Mbps during reception of the mode 1 (905). In the case where the value is lower than 1.8 Mbps, it is switched over to the mode 0 (904), and, in turn, when the value exceeds 2.2 Mbps, it is switched over to the mode 2 (906). If the receiving bit rate does not exceed 1.2 Mbps during a state in which the mode 0 (904) is being received, this indicates that an image bit rate switching is not to be performed. If the rate exceeds 1.2 Mbps, the image bit rate is switched to the mode 1 (905). In the example shown, the lower limit bit rate BBR 8902) is not set because an image bit rate less than the mode 0 (904) is not present. If the receiving bit rate does not lower 2.8 Mbps during a state in which the mode 2 (906) is being received, this indicates that an image bit rate switching is not performed. If the value lowers 2.8 Mbps, the mode is switched to mode 1 (905). In the example shown in this figure, the upper limit bit rate UBR (901) is not set because an image bit rate more than mode 2 (906) is not present. It is satisfactory to record information specifying a bit rate corresponding to each of the modes other than the specified values shown in FIG. 9.

The receiving bit rate monitoring unit 110 at the receiving terminal 100 refers to the image bit rate switching point table 900. The table may be stored in a predetermined exclusive memory at the receiving terminal 100 or it may be stored partially at the memory unit 104.

FIG. 10 shows a form of use of the image bit rate table 800 and the image bit rate switching point table 900.

Both the distribution server 200 and the receiving terminal 100 use the image bit rate table 800. The receiving terminal 1 (1001) and the receiving terminal 2 (1002), which are maintained in a connected relation with a certain distribution server 1000, have tables (1008, 1010) having the same content as that of the image bit rate table 1005 provided in the distribution server 1000. As another embodiment, it may also be possible for the receiving terminal 100 to perform a direct transmission of data indicating the image bit rate value as a method for specifying the image bit rate to the distribution server 200, whereby the distribution server reconstructs the image data in response to the specified image data. In this case, it may also be possible that the distribution server 200 does not use the image bit rate table 800. The receiving terminal 100 uses the image bit rate switching point table 900. It is necessary that the content in the table is prepared for every radio network so as to be dependent on the transfer frequency at the radio line. For example, the image bit rate switching point table 1009 at the receiving terminal (1001) connected to the radio network 1 (1003) and the image bit rate switching point table 1011 at the receiving terminal (1002) connected to the radio network 2 (1004) have different set contents for every mode.

These two tables may also be set in advance at the distribution server 1000, the receiving terminal 1 (1001) and the receiving terminal 2 (1002). In addition, it may also be possible that the table corresponding to the radio network to be relayed is transmitted from the distribution server 1000 to the receiving terminals 1001, 1002 before starting distribution of the image data because the receiving terminal operates on a different radio network. In the case of the radio network having a different data transfer performance, if the operation is applied without switching the table, this might become a cause for inducing an erroneous operation because the image bit rate switching point is different due to a difference in the data transfer capability. Accordingly, if an attempt is made to transfer the table at the time of the start of streaming and at the time of switching of the radio network, it might be possible to prevent the image bit rate switching from being erroneously performed.

In this way, even if the receiving terminal 100 operates on a radio network having a different data transfer performance, the image bit rate switching can be applied through utilization of the most-suitable table to each of the radio lines.

FIG. 11 shows one example of the image bit rate switching operation to an upper level mode.

It is assumed that the receiving terminal 100 uses the image bit rate table 800 and the image bit rate switching point table 900 shown in FIGS. 8 and 9 and the receiving terminal 100 receives the image data of mode 1. The range of the receiving bit rate RBR (1104) for maintaining the image bit rate under the mode 1 is 1.8 Mbps to 2.2 Mbps. The image bit rate switching is not carried out because the receiving bit rate RBR (1104) at the receiving 1 (1100) and the receiving 2 (1101) is 2.0 Mbps. The image bit rate switching 1105 from the mode 1 to the mode 2 is requested at the distribution server 200 because the receiving bit rate RBR (1104) exceeds 2.2 Mbps at the time of receiving 3 (1102). With this operation, the server switches the bit rate, and the terminal receives the image data of the mode 2 from the receiving 4 (1103).

As already described with in reference to FIG. 8, differences in image caused by a difference of the image bit rates before and after the mode switching operation are image quality, quality of audio, image size and the number of displays per predetermined unit of an image and the like.

FIG. 12 shows one example of an image bit rate switching operation to a lower level mode.

It is assumed that the receiving terminal 100 is receiving image data of mode 1 under application of the image bit rate table 800 and the image bit rate switching point table 900 shown in FIGS. 8 and 9 in the same manner as that shown in FIG. 11. The image bit rate switching is not carried out because the receiving bit rate RBR (1204) of the receiving 1 (1200) and the receiving 2 (1201) is 2.0 Mbps. The image bit rate switching 1205 is requested at the distribution server 200 from the mode 1 to the mode 0 because the receiving bit rate RBR (1204) lowers below 1.8 Mbps at the time of receiving 3 (1202). Thus, the image data of mode 0 is received from the receiving 4 (1203).

FIG. 13 shows another example of an image bit rate switching operation to an upper level mode.

In the case where the receiving bit rate is rapidly changed in a continuous manner, image bit rate switching is frequently produced and becomes a load for the image data distribution. In this case, it may also be possible to carry out a controlling operation in such a manner that a unit for discriminating an image bit rate switching has a certain sensitivity and the number of occurrences of switching is reduced.

FIG. 13 shows an example in which an ascending switching sensitivity uc-sensi (1307) is set in the case of switching to the upper level mode. The ascending switching sensitivity uc-sensi (1307) is a numerical value indicating that image bit rate switching is requested at how many times it exceeds the receiving bit rate RBR (1305) in a continuous manner. For example, it is assumed that the ascending switching sensitivity uc-sensi (1307) is set to 3 and image data of mode 1 is being received. At the time of receiving 1 (1300), the image bit rate switching is not carried out because the receiving bit rate RBR (1305) is 2.0 Mbps. However, the image bit rate switching 1306 from the mode 1 to the mode 2 is requested at the distribution server 200 because the receiving bit rate RBR (1305) exceeds 2.0 Mbps by three times in a continuous manner at the receiving 2 (1301), receiving 3 (1302) and receiving 4 (1303). The image data of mode 2 is received from the receiving 5 (1304). The ascending switching sensitivity uc-sensi (1307) is held by the receiving bit rate monitoring unit 110 of the receiving terminal 100. The maximum value of the ascending switching sensitivity uc-sensi (1307) is dependent on the accumulated capacity of the image data at the memory unit 104. It is at least necessary that the same image data of a fragment as that of the number of times avoiding the image bit rate switching (i.e. a value of switching sensitivity) is always stored in the memory unit 104 prior to the reproduction. It is possible that the ascending switching sensitivity uc-sensi (1307) can be automatically set by the receiving terminal 100 through calculation of the capacity of the memory unit 104 and a mean value of data size of one fragment determined in response to the image bit rate. In addition, a user may also set it optionally.

FIG. 14 shows another example of an image bit rate switching operation to a lower level mode.

The image bit rate switching method used for the ascending switching sensitivity shown in FIG. 13 may also be applicable to an image bit rate switching operation to a lower level. In this figure, it is assumed that the descending switching sensitivity dc-sensi (1407) is set 3 and image data of mode 1 is being received. The image bit rate switching is not carried out at the time of receiving 1 (1400) because the receiving bit rate RBR (1405) is 2.0 Mbps. An image bit rate switching 1406 from mode 1 to mode 0 is requested at the distribution server 200 because the receiving bit rate RBR (1405) lowers below 1.8 Mbps continuously three times at the receiving 2 (1401), receiving 3 1402) and receiving 4 (1403), respectively. The image data of mode 0 is received from the receiving 5 (1404).

The descending switching sensitivity dc-sensi (1407) is held at the receiving bit rate monitoring unit 110 of the receiving terminal 100. In addition, a method for setting the descending switching sensitivity dc-sensi (1407) is also similarly carried out in the same manner as that for the ascending switching sensitivity uc-sensi (1307).

Figure 15:
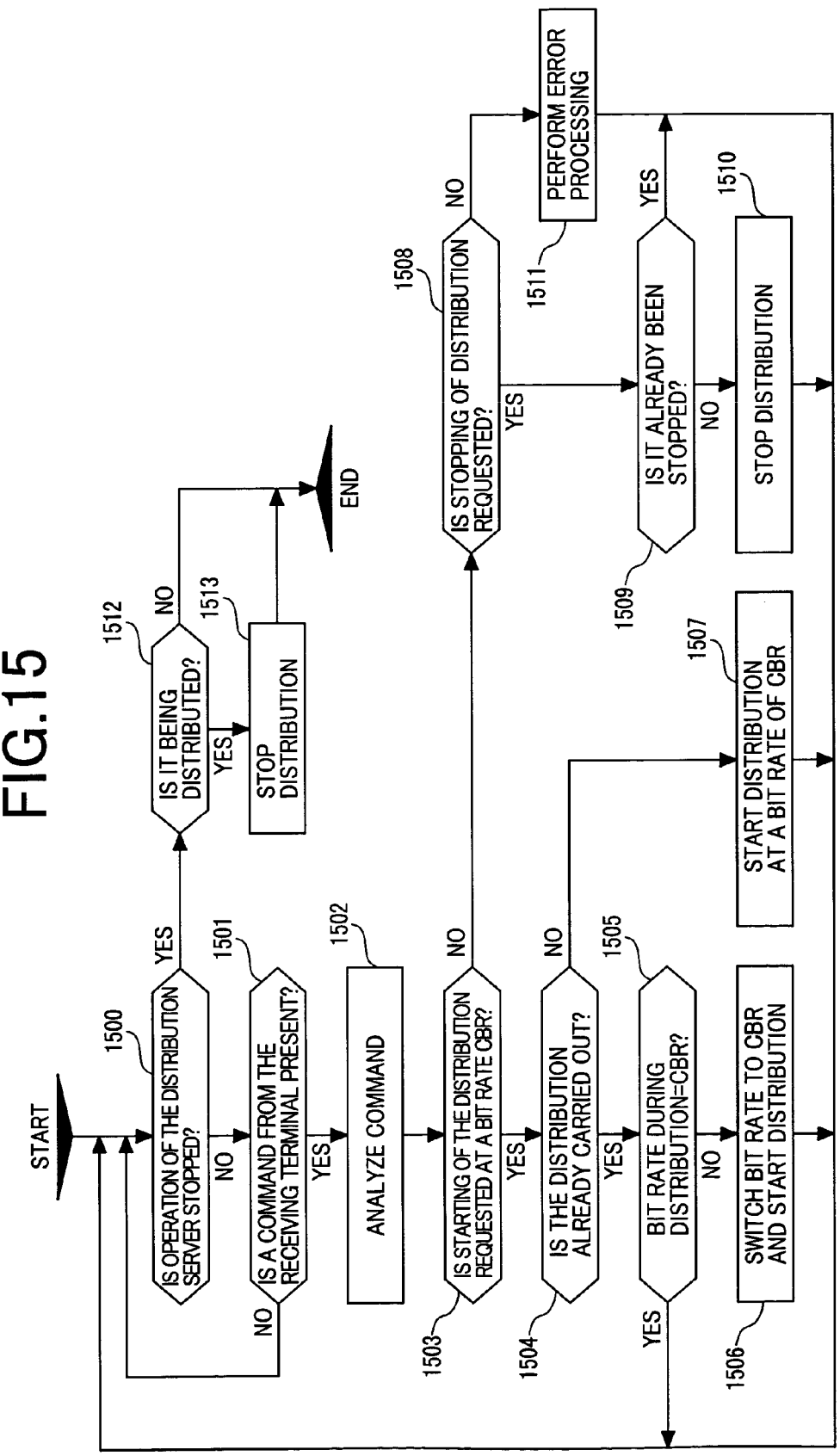
FIG. 15 is a flow chart for showing an operation of a distribution server.

FIG. 15 is a flow chart showing an operation of the distribution server 200.

At first, it is determined whether or not the operation of the distribution server 200 is stopped (1500). In the case of continuing the operation, it is determined at (1501) whether or not a command receiving operation from the receiving terminal 100 is present. In the case of operation of the server data stopped, it is determined at (1512) whether or not the image data is being distributed at present, and if the distribution is being carried out, the distribution is stopped at (1513) and the processing is finished. In the case where a of command for the receiving terminal is present during continuation of the operation, the command is analyzed at (1502) and it is determined at (1503) whether or not it is a request for starting the distribution with the image bit rate CBR. If this is a request for starting the distribution, it is determined at (1504) whether or not the image data has already been distributed. If the image data has already been distributed, it is determined at (1505) whether or not the image bit rate of the data being distributed is the same as the requested image bit rate CBR. In the case where the image bit rate CBR is the same as the image bit rate of the data being distributed, the command is ignored. In the case where they are different from each other, but the rate is switched to the image bit rate CBR requested by the command and the distribution is started (1506). If the command is not a request for starting the distribution at the processing 1503, subsequently it is determined at (1508) whether or not the command is a request for stopping the distribution. If the command is a request for stopping the distribution, it is determined at (1509) whether or not the operation has already been stopped; and, in turn, if the operation is not stopped, distribution of the image data is stopped at (1510). In the case where the operation has already been stopped, the command is ignored. In the case where the command is not a request for stopping the distribution at the processing 1508, an error processing is carried out at (1511) because the command cannot be recognized by the distribution server 200. As an example of the error processing, there is a processing or the like to inform the receiving terminal that the command is not effective. It may also be applicable, as a method in which the distribution server 200 switches the image bit rate, that a plurality of kinds of image data indicated in the image bit rate table 800 are all prepared in advance in an image data inputted from the outside, and the image data with the image bit rate specified by the receiving terminal 100 is selected out of them and distributed. In addition, in the case where the image data that the distribution server 200 inputs from the outside is one non-compressed image data, image data converted by a predetermined method may also be distributed by changing some parameters, such as the number of frames to be transmitted, for example, in such a manner that the image data has an image bit rate specified by the receiving terminal 100. Further, in the case where the image data inputted by the distribution server 200 from the outside is one compressed image data, the image data re-converted by a predetermined method may also be distributed in such a manner that the bit rate may become an image bit rate specified by the receiving terminal 100.

Figure 16:
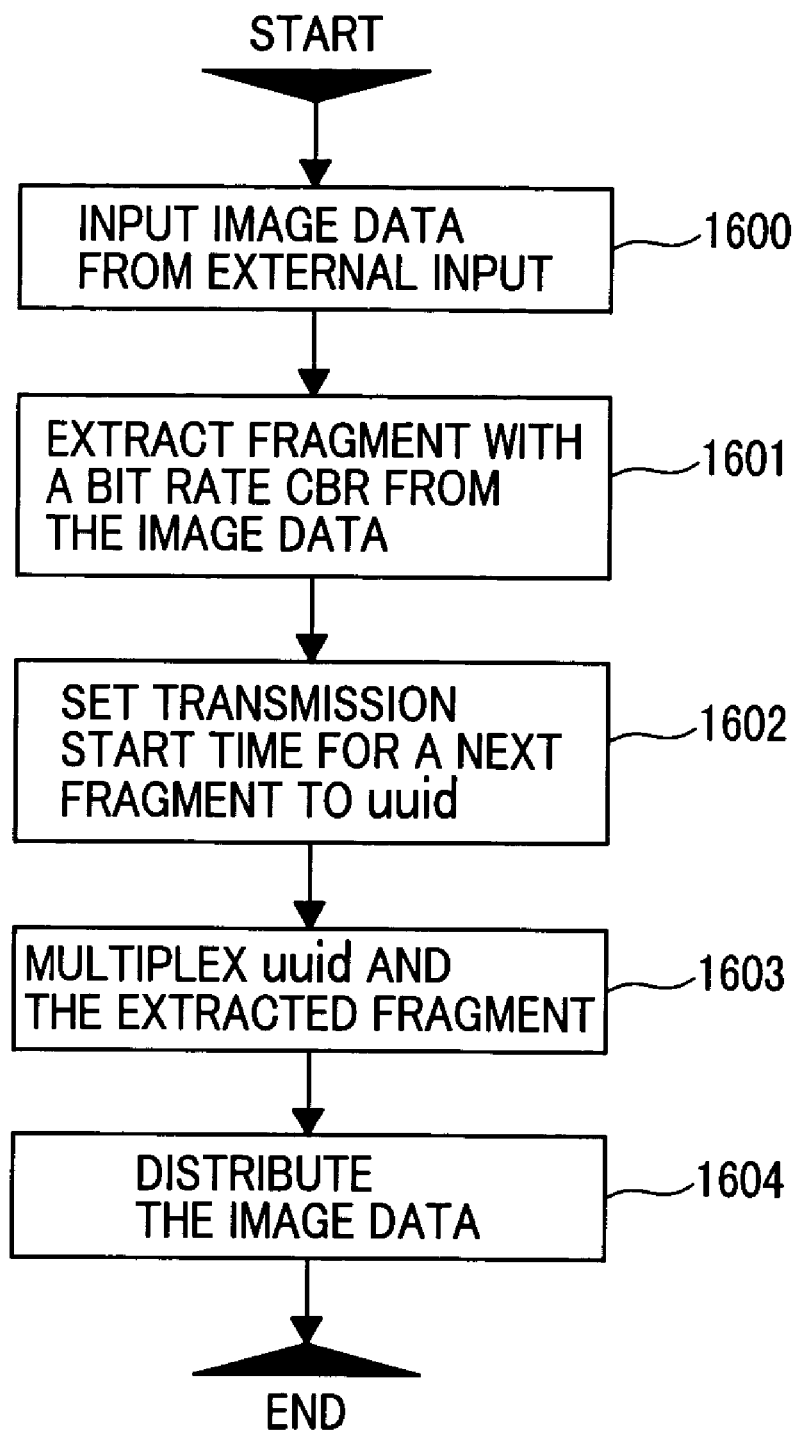
FIG. 16 is a flow chart for showing a processing of multiplexing "uuid" storing the monitoring trigger information to the distribution image data.

FIG. 16 is a flow-chart of the processing of the distribution server 200, which performs a multiplexing processing with respect to the "uuid" having the monitoring trigger information stored in the distribution image data.

At first, the image data is inputted from the outside through the image data input unit 201 (1600). Next, the fragment of the image bit rate GBR is extracted from the inputted image data through an image data re-construction unit 203 (1601). Concurrently, a next fragment transmission starting time is set at "uuid" through a monitoring trigger information generating unit 207 (1602). In the case where the fragment is constituted every certain specified time, a reference timer 206 is referred to and one fragment time is added from the transmission time of the fragment to be transmitted now so as to set a transmission starting time. In the case where the fragment time interval is not constant, a reproducing time for the fragment to be transmitted now is added to a transmission time of the fragment to be transmitted so as to set a transmission start time. The transmission start time is distributed to the receiving terminal 100 through the image data transmission unit 204 by multiplexing "uuid" with respect to the extracted fragment through the image data re-constructing unit 203 (1604).

Figure 17:
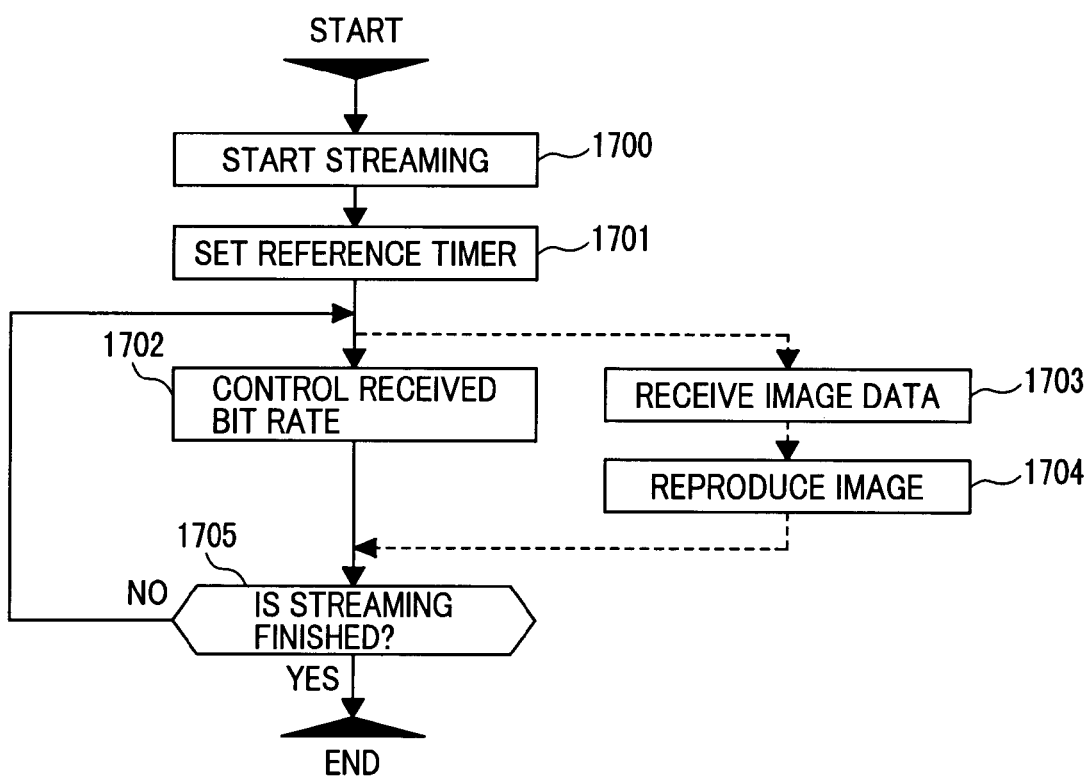
FIG. 17 is a flow chart for showing the overall operation of a receiving terminal unit.

FIG. 17 is a flow chart showing the overall operation of the receiving terminal 100.

At first, a streaming of the image data is started (1700) to set the reference timer (1701). During the streaming operation, receiving bit rate control is executed through the receiving bit rate monitoring unit 110 (1702) in parallel with receipt (1700) of the image data through the image data receiving unit 102 and a reproducing operation (1704) carried out by a reproducing unit 105. This operation is repeated until the streaming operation is completed (1705).

Figure 18:
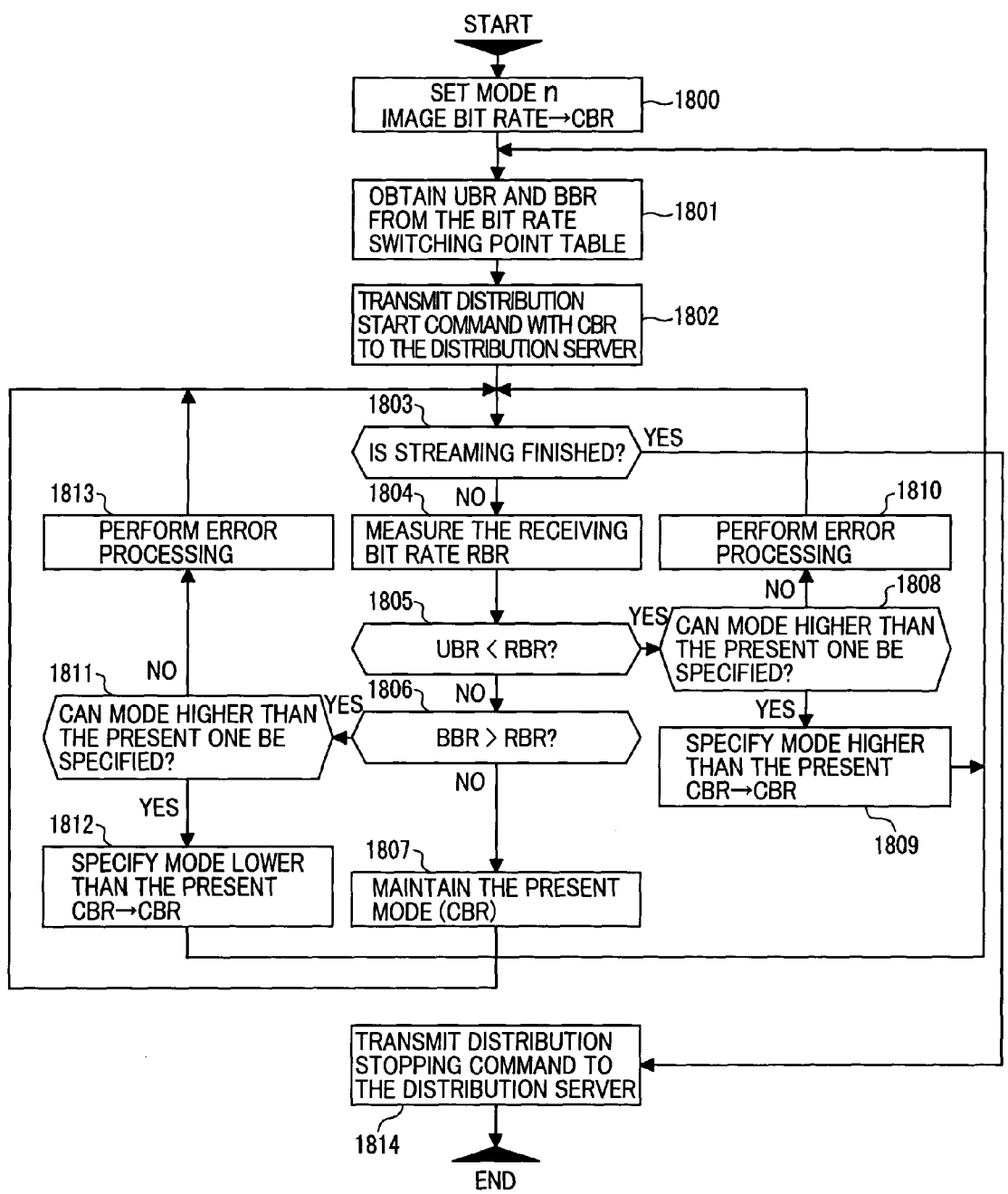
FIG. 18 is a flow chart for showing a receiving bit rate controlling procedure.

FIG. 18 is a flow chart showing the sequence of the receiving bit rate controlling operation performed at the receiving terminal 100.

At first, a mode$_n$ of the required image data is set at the distribution server 200 (1800). The image bit rate GBR is determined from the mode$_n$ in reference to the image bit rate table 800. Next, the upper limit rate UBR and the lower limit bit rate BBR are obtained (1801) in reference to the image bit rate switching point table 900, and a distribution starting request command with the image bit rate CBR is transmitted to the distribution server 200 (1802). Subsequently, it is discriminated whether or not the streaming operation is finished (1803); and, if the operation is finished, the distribution stopping request command is transmitted to the distribution server to finish the processing (1814). In the case where the streaming operation is to be continued, the receiving bit rate RBR is measured (1804) and the upper limit bit rate UBR is compared with the lower limit bit rate BBR (1805, 1806). If the receiving bit rate RBR is in a range between the upper limit bit rate UBR and the lower limit bit rate BBR, the present mode is maintained (1807). In the case where the mode is maintained, a request command transmission is not carried out with respect to the distribution server 200. Also, in the case where the distribution server maintains the present mode in order to hold a recording of the received state of the receiving terminal 100, it may also be applicable that this fact is informed to the distribution server 200. In the case where the receiving bit rate RBR exceeds the upper limit bit rate UBR at the processing 1805, it is determined at (1808) whether or not a mode of a higher image bit rate than that of the present one can be specified. If a higher mode can be specified, a mode higher than the present image bit rate CBR is set at the request command (1809) and transferred to the processing 1801 in order to transmit it to the distribution server 200. In the case where a higher mode cannot be specified, error processing is carried out (1810). An example of the error processing is to display a message at the monitor of the receiving terminal 100 indicating that the image bit rate switching cannot be executed and the like. However, in this case, the error processing operation can be skipped because the receiving bit rate is in an ascending direction. In the case where the receiving bit rate RBR is lower than the lower limit bit rate BBR at the processing 1806, it is determined at (1811) whether or not a mode of a lower image bit rate than the present one can be specified. In the case where a lower the mode can be specified, a lower mode than that of the present image bit rate CBR is set at the request command (1812), and it is transferred to the processing 1801 in order to transmit it to the distribution server 200. In the case where a lower mode cannot be specified, error processing is carried out (1813). An example of the error processing is to display a message at the monitor of the receiving terminal 100 indicating that image bit rate switching cannot be executed and the like.

Figure 19:
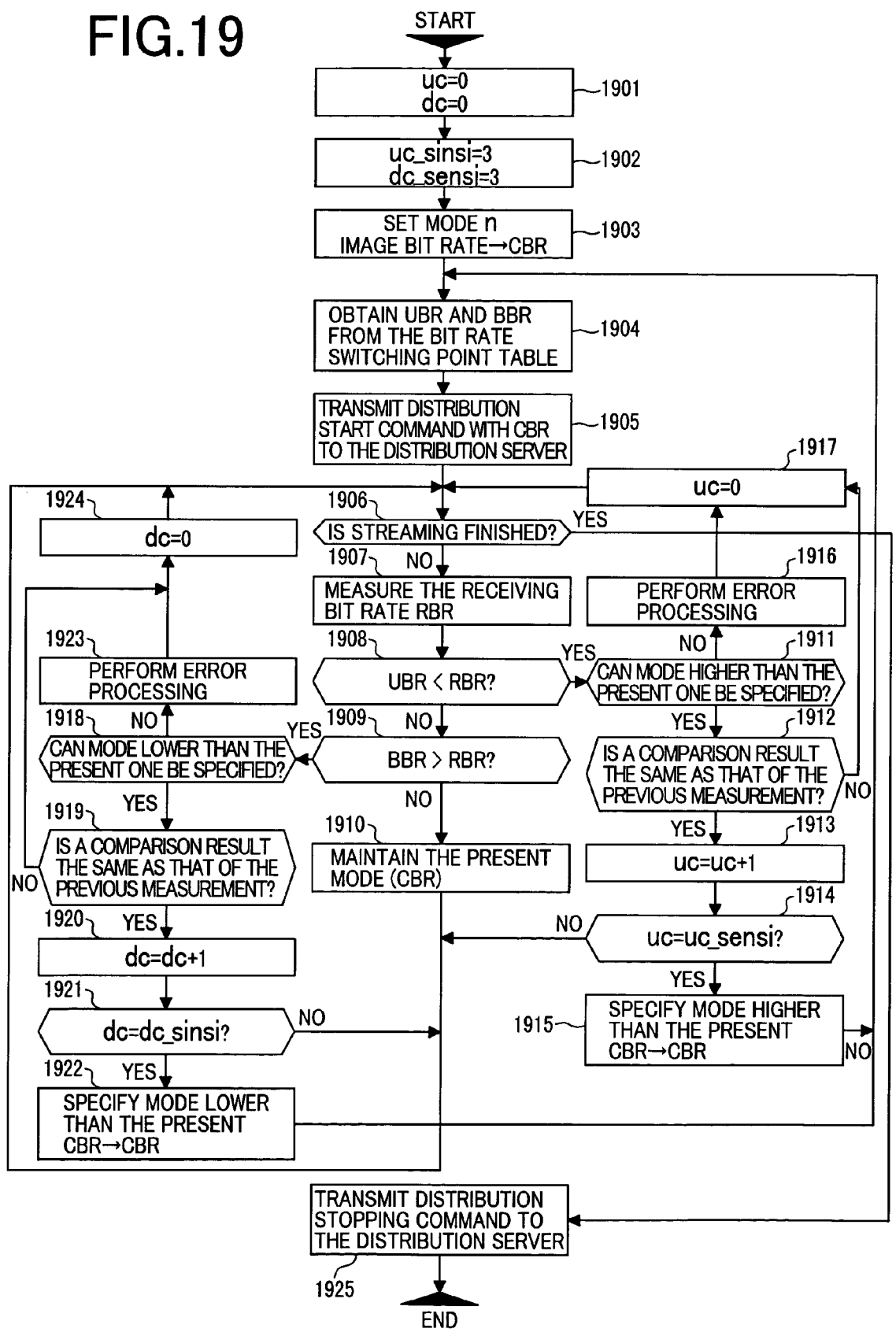
FIG. 19 is a flow chart for showing a receiving bit rate controlling procedure using an ascending switching sensitivity and a descending switching sensitivity.

FIG. 19 is a flow-chart showing the sequence of receiving bit rate control under application of an ascending switching sensitivity and a descending switching sensitivity at the receiving terminal 100.

At first, the counter (uc) for storing a continuous ascending time of the receiving bit rate and the counter (dc) for storing a continuous descending time of the receiving bit rate are reset to 0 (1901). Next, the ascending switching sensitivity uc-sinsi and the descending switching sensitivity dc-sinsi are set (1902). In the example shown in this figure, both sensitivities are set to 3. Subsequently, a mode$_n$ of the required image data is set at the distribution server 200 (1903). The image bit rate CBR is determined from the mode$_n$ in reference to the image bit rate table 800. Next, the image bit rate switching point table 900 is referred to and the upper limit bit rate UBR and the lower limit bit rate BBR are obtained (1904), and the distribution starting request command of the image bit rate CBR is transmitted to the distribution server 200 (1905). Subsequently, it is determined at (1906) whether or not the streaming operation is finished. In the case where the streaming operation is finished, the distribution stopping request command is transmitted to the distribution server to finish the processing (1825). In the case that the streaming operation is continued, the receiving bit rate RBR is measured (1907), and the upper limit bit rate UBR is compared with the lower limit bit rate BBR (1908, 1909). If the receiving bit rate RBR is in a range between the upper limit bit rate UBR and the lower limit bit rate BBR, the present mode is maintained (1910). In the case where the receiving bit rate RBR at the processing 1908 exceeds the upper limit bit rate UBR, it is determined at (1911) whether or not a mode of a higher image bit rate than the present one can be specified. In the case where a higher mode cannot be specified, error processing is carried out (1916) and the continuous ascending time counter (uc) is rest to 0 (1917). An example of error processing is the display of a message at the monitor of the receiving terminal 100 saying that switching the image bit rate to the upper level mode cannot be executed. However, in this case, it may also be applicable that the error processing can be skipped because the receiving bit rate is in an ascending direction. In the case where a higher mode can be specified, it is determined at (1912) whether or not a result of comparison between the receiving bit rate RBR and the upper limit bit rate UBR is the same as the previous result of comparison. If the result of comparison is different, the continuous ascending time counter (uc) is reset to 0 (1917). If the result of comparison is the same, the continuous ascending time counter (uc) is incremented by 1 (1914), and it is determined at (1914) whether or not the ascending switching sensitivity uc-sinsi and the continuous ascending time counter (uc) are equal to each other. In the case where they are not equal to each other, the operation is transferred to the processing 1906 and returns to a normal processing loop. In the case where they are equal to each other, a higher mode than that of the present image bit rate CBR is set to a request command (1915) and it is transferred to the processing 1904 so as to be transmitted to the distribution server 200. In the case where the receiving bit rate RBR is lower than the lower limit bit rate BBR at the processing 1909, it is determined at (1918) whether or not a mode of a lower image bit rate than the present value can be specified. If a lower mode cannot be specified, error processing is carried out (1923), and the continuous descending time counter (dc) is reset to 0 (1924). An example of the error processing is display of a message at the monitor of the receiving terminal 100 saying that the image bit rate switching to the lower level mode cannot be executed. In the case where a lower mode can be specified, it is determined at (1919) whether or not a result of comparison between the receiving bit rate RBR and the upper limit bit rate BBR is the same as the previous result of comparison. If the result of comparison is different, the continuous descending time counter (dc) is reset to 0 (1924). If the result of comparison is the same, 1 is added to the continuous descending time counter (dc) (1920), and it is determined at (1921) whether or not the descending switching sensitivity dc-sinsi and the continuous descending time counter (dc) are equal to each other. In the case where they are not equal to each other, the operation is transferred to the processing 1906 and returns to a normal processing loop. In the case where they are equal to each other, a lower mode than that of the present image bit rate CBR is set to a request command (1922) and it is transferred to the processing 1904 so as to be transmitted to the distribution server 200.

Figure 20:
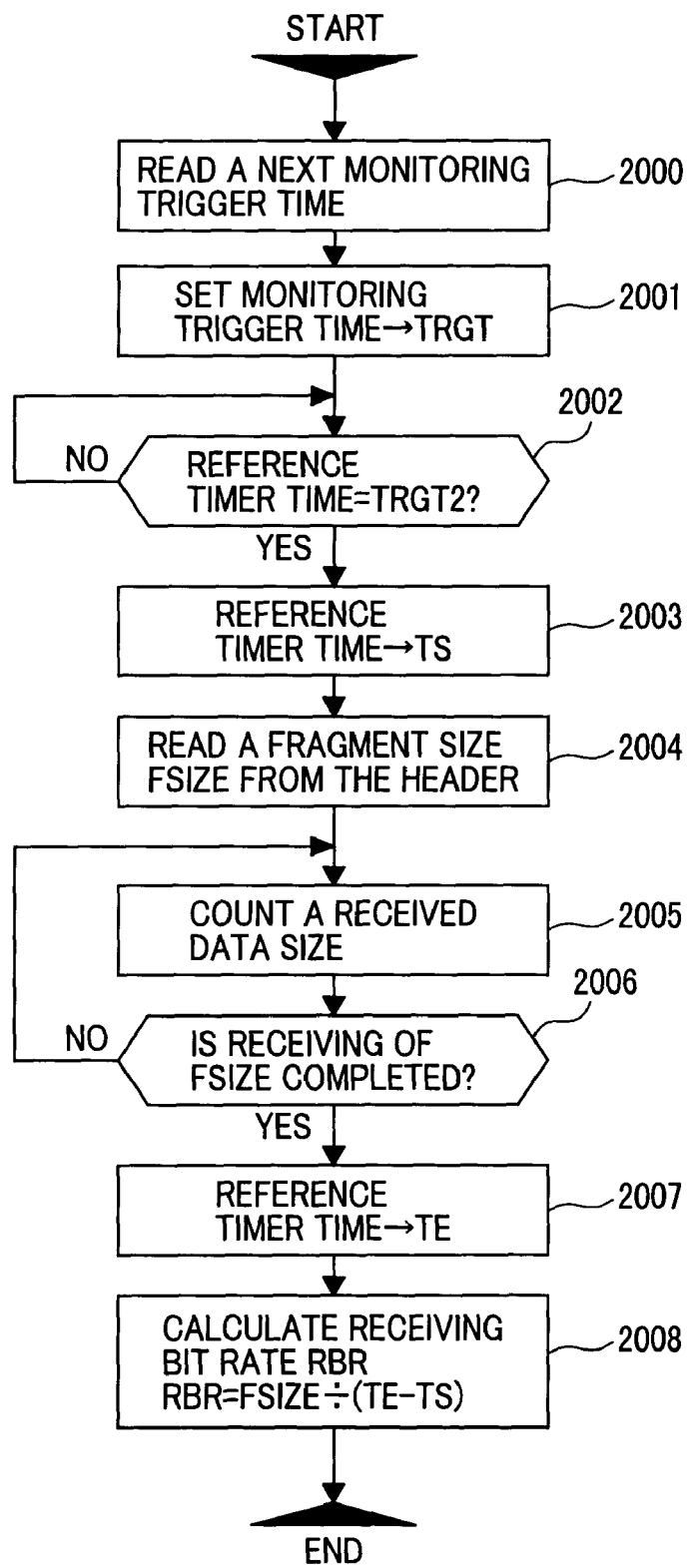
FIG. 20 is a flow chart for showing a procedure for measuring the receiving bit rate.

FIG. 20 is a flow-chart indicating a procedure for measuring the receiving bit rate at the receiving terminal 100.

At first, the monitoring trigger time is read out of the received fragment "uuid" (2000) and set to the monitoring trigger control unit 109 (2001). In the example shown in the figure, the monitoring trigger time is defined as TRGT. The reference timer time is compared with the monitoring trigger time TRGT, and the processing waits until they coincide with each other (2002). When they coincide with each other, the reference timer time TS at this time is read out (2003). The receipt of a new fragment is started from the time TRGT. At this time, the fragment size FSIZE is read out (2004) of the header of the fragment. Subsequently, the data size of the fragment being received is counted (2005) and this is repeated until the counted value reaches FSIZE (2006). When the counted value reaches FSIZE and the receipt of the fragment is completed, the reference timer time TE at that time is read out (2007). Lastly, the receiving bit rate RBR is calculated (2008). The receiving bit rate RBR is a value in which the fragment size FSIZE is divided by the time (TE-TS) required for the receiving operation. The method shown in FIG. 20 can hold only a period in which the data being burst transferred reaches the receiving terminal 100. Thus, the measurement accuracy of the receiving bit rate can be improved and an accurate image bit rate switching control can be performed because no measurement is carried out at a time other than the burst transferring period in which the data is not reached, as compared with a technology for measuring a predetermined time, for example.

A method of monitoring the received state for use in requesting an image bit rate switching at the receiving terminal 100 is not limited to the aforesaid method, but may be carried out by another method. For example, as already described with reference to FIG. 5, either the header unit of the fragment or the re-distribution planned time for the data unit on the moving image and audio may be stored as the monitoring trigger information. Further, as a still further embodiment, in the case where the distribution server 200 and the receiving terminal 100 store a transmitter having the same clock, a clock counter value planned to be distributed may be stored as the monitoring trigger information in place of the time information. The clock counter value may be an accumulated clock value from the starting time or a relative clock value from the previous fragment distributing operation.

Figure 21:
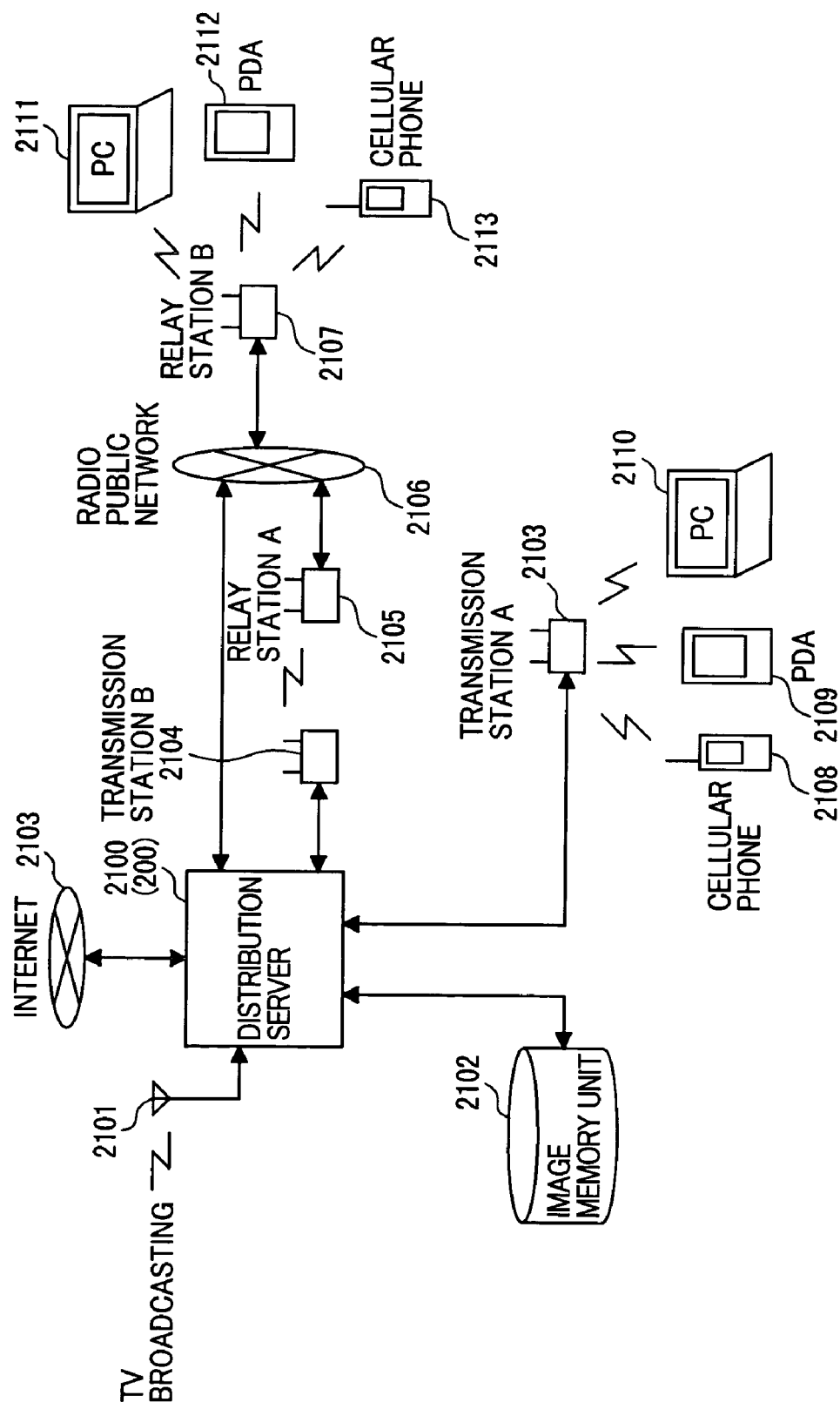
FIG. 21 is a block diagram which shows one example of a practical form of a system using a distribution server and a receiving terminal.

FIG. 21 shows one example of an applied form of the invention in which the deliver server 200 of the present invention and the receiving terminal 100 are provided.

This figure shows an example of a configuration in which to the distribution server 2100 has connected thereto a TV receiver set 2101 for receiving a TV broadcast, an external public network 2103, such as the internet or the like, an image memory device 2102 for use in recording image data inputted from the external public network 2103 and image data including a TV program received by the TV receiver set 2101 as converted by a predetermined converting method, a transmission station A (2103) and a transmission station B (2104) to be connected to some mobile terminals, such as a notebook type PC, PDA and mobile phone and the like, through a radio network. The image data taken from the external public network 2103 or the TV receiver set 2101 is distributed on a real time basis in response to a request from the mobile terminals. In addition, it may also be applicable that the image data taken from the external public network 2103 or the TV receiver set 2101 is first accumulated at the image memory device 2102, and then the image data is properly distributed in response to the request from the mobile terminals. The distributing operation passing through the transmission station A (2103) is an example in which the mobile terminals, such as the notebook type PC (2110), PDA (2109) and mobile phone 2108 or the like, directly receive image data, to allow it to be seen and heard. In the case of distributing through the transmitter center B (2104), the image data passes through the relay station A (2105), the radio public network 2106 and the relay center B (2107) and the image data is received at the mobile terminals (2111, 2112, 2113). In addition, in the case of the distribution for outputting image data directly from the distribution server to the radio public network 2106, the image data passes through the relay station B (2107), and the image data is received at the mobile terminals (2111, 2112, 2113), where it can be seen and heard. At each of the distributing paths, the image data may also be distributed through a plurality of transmitter centers, relay centers and radio line networks.

Figure 22:
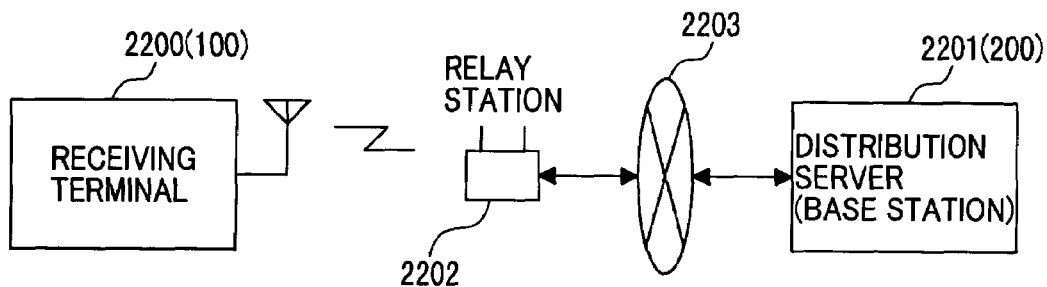
FIG. 22 is a block diagram which shows an example of a typical practical form of a system using a distribution server and a receiving terminal unit.

FIG. 22 shows an example of a typical applied form of a system using the distribution server 200 and the receiving terminal 100 of the present invention.

Distribution of the image data is carried out such that the image data is transmitted from the distribution server 2201 in response to a request from the receiving terminal 100, the image data passes through the radio public network 2203 and the relay center 2202 and reaches the receiving terminal 100 acting as a requesting unit.

The foregoing description up to now has been directed to an example in which the image bit rate switching operation, responding to the request of the receiving terminal 100, is executed at the distribution server 2201. However, the image bit rate switching operation may also be carried out at the relay center 2202. With this operation, the relay center 2202 is required to perform the image bit rate switching control operation, resulting in a reduction in the processing load at the distribution side. Additionally, the receiving terminal 100 has an effect in that its response is improved as the switching operation is carried out.

An example of the charging form for the image distributing system to which the method of the present invention has been applied may be applied to a case in which a specified charge may be applied for every one image content distribution irrespective of the presence or non-presence of the image bit rate switching operation. In addition, the charging may be applied in response to either the reproducing time (a distributing time) or the amount of distributed data irrespective of the presence or non-presence of the image bit rate switching operation. Further, the charging along with the content of the image bit rate switching operation may be applied under any charging conditions, such as the reproducing time (the distributing time) or the distributing data amount for every distribution of one image content and the like. For example, when the image bit rate is low, the charging in utilization is calculated to be low, and when the image bit rate is high, the charging in utilization is calculated to be high.

A specified charging for every image content distribution operation or a charging method associated with either the reproducing time or the distribution data amount or the like has some merit in that the charging management can be easily performed at the distribution side and the utilization charge can be easily understood by a customer. In turn, the quality of the distributed image or audio attained through application of the image bit rate switching control is apt to show a low quality when the image bit rate is low, and it is apt to show a high quality when the image bit rate is high. With this arrangement, the charging method in which the content of the image bit rate switching operation adjusted has a merit in that a user can understand the utilization charge because the impression obtained at the time of seeing or hearing reflects on the charging.

Figure 23:
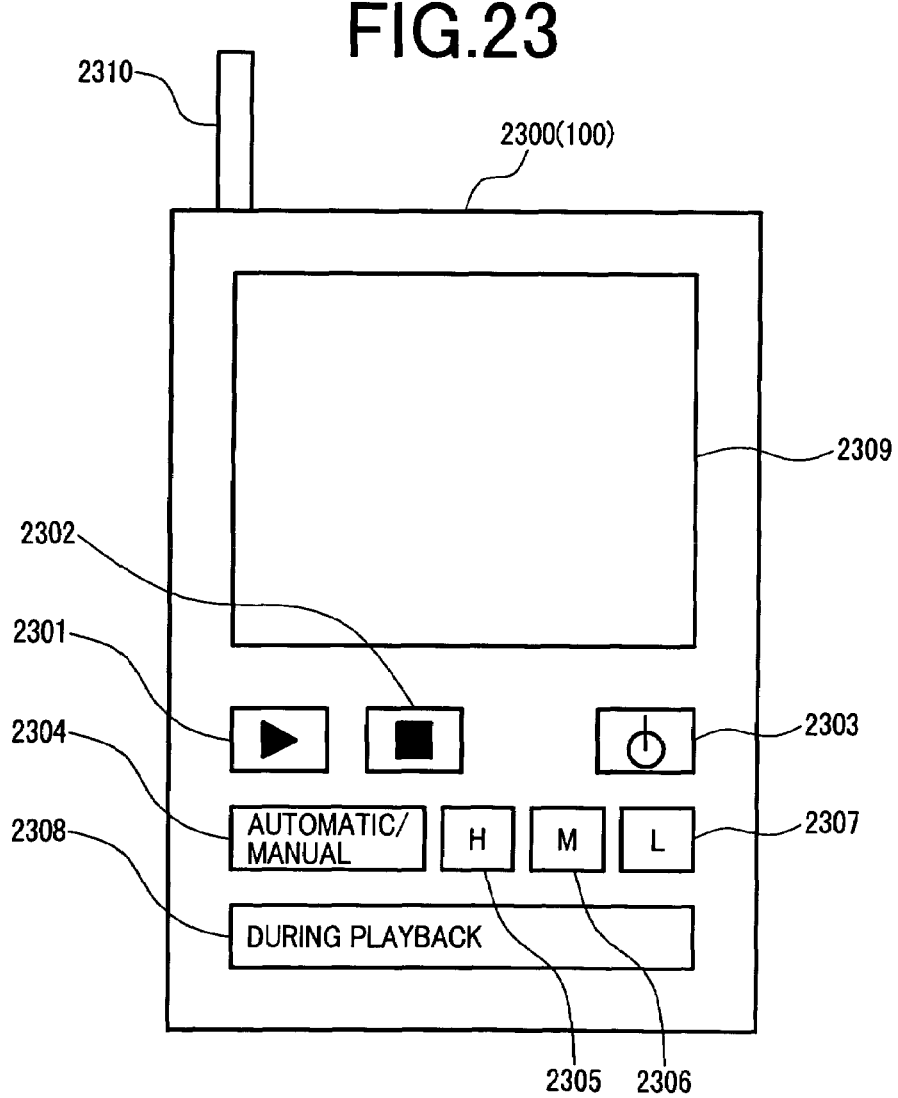
FIG. 23 is a diagram which shows one example of a user-interface of the receiving terminal.

FIG. 23 shows one example of a user-interface of the receiving terminal 100.

This figure shows an example of a GUI (Graphical User Interface) displayed at the monitor of a mobile terminal, such as a PDA and the like. The GUI is constituted by a moving image display frame 2309, a reproducing (an image distributing start request) button 2301, a stop (an image distributing stop request) button 2302, a finish button 2303, an automatic and manual switching button 2304 for the image bit rate, manual selection buttons for the image bit rate (2305, 2306, 2307) and an operating state display frame 2308 or the like. It may also be that the GUI may have, in addition to the foregoing elements, another operating button or display frame and the like as required. In the case where this system is actually installed in a mobile phone, these instruction buttons are arranged under an application of phone number input keys or menu keys or the like. The receiving terminal 2300 receives information such as image data from the server through the antenna 2310 and displays it in sequence at the moving image display frame 2309. Application of the present invention causes the bit rate of this moving image to be controlled. The image bit rate switching control may be carried out automatically by the receiving terminal 2300, and it may be further manually switched by the user himself. For example, the image bit rate switching control is changed over through a toggle between an automatic mode and a manual mode every time the auto/manual switch button 2304 is depressed. In the case of the manual mode, it may also be that a user depresses the manual selection buttons (2305, 2306, 2307) corresponding to the type of the image bit rate to cause them to be switched. For example, in the case of service in which a charging fee that is adjusted by the content of the image bit rate switching is applied to the utilization charge, the low image bit rate can be maintained continuously when it is desired to see or hear the image at a low charging fee. In addition, when an automatic switching control accompanied by a switching accuracy is being carried out, the automatic control is interrupted to enable the switching operation to be carried out under a user's preference with respect to the quality of the image even if the operation does not reach the automatic switching condition. In general, the impression obtained on seeing or hearing the moving image or audio sound shows a certain disturbance by individual users. A friendly user may accept a slight variation in image quality and a sensitive user may be sensitive to such a variation in image quality. Due to this fact, it is possible to apply an impression that a manual switching rather than an automatic switching of the image bit rate sometimes provides more convenience in use.

Also, in the case of image distribution under application of only a wired line, such as the internet, variation in the data transfer speed is generated under the influence of the applied state of the line. However, in general, the wired line frequently has a far wider data transfer area as compared with that of the radio line and the variation of the receiving bit rate at the terminal hardly produces a problem. In turn, it is difficult in practice to assure a wide data transfer area with the radio line in view of the restrictions on the international standards or limitations on performance of the communication device or the like. Further, due to a characteristic of the radio network, the device may easily be influenced by attenuation or reflection of the electromagnetic wave and by the surrounding environment, and, additionally, a variation in the data transferring speed frequently happens. As described above, the method for effecting the image distributing operation of the present invention, which has been described up to now, is particularly effective in the case wherein it is applied to an image distributing system using a radio line where a variation in the data transfer speed may easily occur.

It is also applicable that the distributed data handled by the image distribution apparatus of the present invention is data of moving image only or data of audio sound only. In addition, data other than that of a moving image or audio sound may also be applied. Such data may be data for the Web (World Wide Web), such as still image data, text data, SGML (Standard Generalized Markup Language) or HTML (Hyper Text Markup Language).

As a monitoring means separate from the method for monitoring the receiving bit rate, it may also be applicable that a residual amount of data at the memory unit 104 having the received data stored therein is monitored. The residual amount of data at the memory unit 104 is influenced by the data-receiving throughput. If the data receiving throughput is decreased, the residual amount of data is apt to be decreased. In turn, if the data-receiving throughput is increased, the residual amount of data is apt to be increased. In the case where these states are monitored and the residual amount of data is lower than the predetermined amount, the system is switched to an image bit rate of a lower level mode. In addition, when the residual amount of data exceeds the predetermined amount, the system is switched to an image bit rate of an upper level mode.

This method enables the monitoring operation to be executed on an extension of a data reading-out operation in which the reproduction unit at the receiving terminal reads out data, and it can be installed while the processing amount of the monitoring operation is reduced.

In the case where the image data to be received is changed into a cipher code as another monitoring means and the decoder 114 arranged in the reproducing unit 105 performs a decoding of the received data, it may also be applicable that the frame rate for the decoding operation is monitored. The frame rate of the decoding is influenced by the data-receiving throughput. The frame rate of decoding is decreased because the frame to be reproduced does not reach a value as planned if the data-receiving throughput is decreased. In turn, if the data-receiving throughput is improved, the reproducing frame reaches a value greater than a planned one, so that the frame rate of the decoding is improved. As a procedure for switching the receiving bit rate, the frame rate at the time of decoding, for example, is a lower than the frame rate specified by the content, it is switched to the image bit rate of lower level mode. In addition, when it is lower than the frame rate specified by the content, it is switched to the image bit rate of an upper level mode. According to this method, a complex calculation is not needed in particular, and the number of frames per predetermined time is counted to enable the monitoring operation to be realized, so that it is possible to mount it with the processing amount of the monitoring operation being set low.

As a still further monitoring means, it may also be applicable that a time stamp included in the received image data is monitored. The reference timer 108 of the receiving terminal 100 manages the time stamp. For example, the STC (System Time Clock) of the MPEG system corresponds to it. The image data of MPEG contains information concerning the reproduction time, such as SCR (System Clock Reference), PTS (Presentation Time Stamp) and the like. By SCR it is meant that the time becomes a reference of the reproducing time. At the receiving terminal 100, the reference time is set to STC, i.e. the reference timer 108 at the time of receiving SCR. PTS is time information added for every frame of the image data, and it is used for controlling the timing for reproducing the decoded frame. The decode image is displayed at the time of decoding a certain frame when the value of PTS of the frame coincides with the value of STC. Also, at the reproducing time management using PTS, it is influenced under the data-receiving throughput.

When the data-receiving throughput is decreased, the value of PTS does not correspond to the value of CTS because its decoding is also delayed, and the difference in the time information is increased in a negative direction. In turn, if the data-receiving throughput is improved, the difference in the time information is increased in a positive direction because a frame waiting for the reproduction is added. In the case where these relations are monitored and a difference between the values of STC and PTS at the time of the decoding operation exceeds a predetermined time difference in a negative direction, the system is switched to an image bit rate of a lower level mode. In addition, when the difference between the values of STC and PTS exceeds more than a predetermined time difference in a positive direction, the system is switched to an image bit rate of an upper level mode.

It is possible to get an accurate delay time when a data receiving operation is performed because this method checks the time information included in the image data. With this operation, it becomes possible to feed-back an accurate starting time relative to a reproduction starting operation after the image bit rate switching.

All of the methods for monitoring the receiving bit rates described above employ a monitoring operation involving monitoring trigger information sent from the distribution server for a predetermined period from trigger information included in the monitoring trigger information sent from the distribution server.

According to the present invention, it becomes possible to provide an image distribution system using a radio line where a data transfer speed variation may easily occur, wherein the receiving terminal itself operates to perform an accurate monitoring of the receiving bit rate at the time of an image streaming operation and a switching to the most-suitable image bit rate is requested to the server in response to the result of the monitoring operation, with the result in that it becomes possible to provide means capable of executing a stable image streaming operation.

What is claimed is:

1. A distribution server comprising:
an image data generating unit that generates a first image data fragment and a second image data fragment, which is a next fragment of said first image data fragment;
a communication unit that transmits and receives data to and from a terminal through a communication path; and
a bit rate switching control unit that controls said image data generating unit to change an image bit rate,
wherein said image data generating unit inserts monitoring trigger information, which indicates a transmission start time of said second image data fragment, into said first image data fragment and inserts data size information, which indicates a data size of said second image data fragment, into said second image data fragment, for executing a receiving bit rate calculation in a receiving side by dividing said data size of said second image data fragment by an interval of time between the start time calculated based on said transmission start time and the end time detected based on said data size of said second image data fragment, and
wherein when said communication unit receives an image bit rate switching request command from said terminal which is generated based on said receiving bit rate calculation, said bit rate switching control unit controls said image data generating unit to change an image bit rate.

2. A terminal device comprising:
a communication unit that receives a first image data fragment and a second image data fragment, which is a next fragment of said first image data fragment, from a distribution server through a communication path;
a reproducing unit that reproduces said received first image data fragment and said received second image data fragment;
a monitoring unit that monitors a receiving bit rate of said received first image data fragment and said received second image data fragment, wherein said first image data fragment includes monitoring trigger information, which indicates a receiving start time of said second image data fragment, wherein said second image data fragment includes data size information, which indicates a data size of said second image data fragment, wherein said monitoring unit executes a receiving bit rate calculation by dividing said data size of said second image data fragment by an interval of time between the start time calculated based on said receiving start time and the end time detected based on said data size of said second image data fragment, and wherein said communication unit sends distribution bit rate switching information to said distribution server for changing image bit rate in said distribution server, in response to a result of said receiving bit rate calculation.

3. The terminal device according to claim 2 further comprising:

a timer that counts time, wherein said monitoring unit compares the time of said timer with said receiving start time specified by said monitoring trigger included in said first image data fragment, and starts said monitoring of the receiving bit rate from said receiving start time.

4. The terminal device according to claim 2 wherein said monitoring unit compares a measured receiving bit rate with a bit rate switching condition recorded in a recording unit and feeds said bit rate switching information in response to a result of said comparison.

5. The terminal device according to claim 2, wherein said monitoring unit monitors a residual amount of said received image data stored at a recording unit, compares it with a bit rate switching condition recorded in a recording unit and feeds said bit rate switching information in response to a result of said comparison.

6. The terminal device according to claim 2, further comprising:

a decoder that decodes said received image data, wherein said monitoring unit monitors a frame rate of said decoder, compares it with a bit rate switching condition recorded in a recording unit and feeds said bit rate switching information in response to a result of said comparison.

7. The terminal device according to claim 2 further comprising:

a display unit that displays said received image data; and an input instruction unit that receives an input from a user, wherein an instruction that changes a bit rate through said input instruction unit in regard to the image data displayed at said display unit is received and said instruction is fed as said switching information.

* * * * *